United States Patent
Hori

(10) Patent No.: US 11,567,708 B2
(45) Date of Patent: Jan. 31, 2023

(54) IMAGE FORMING APPARATUS HAVING ONE OR MORE PORTS TO WHICH PORTABLE MEMORY IS ATTACHABLE

(71) Applicant: BROTHER KOGYO KABUSHIKI KAISHA, Nagoya (JP)

(72) Inventor: Toshikazu Hori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/558,818

(22) Filed: Dec. 22, 2021

(65) Prior Publication Data
US 2022/0214839 A1    Jul. 7, 2022

(30) Foreign Application Priority Data

Jan. 5, 2021 (JP) .............................. JP2021-000483
Jan. 5, 2021 (JP) .............................. JP2021-000525

(51) Int. Cl.
*G06F 3/12* (2006.01)

(52) U.S. Cl.
CPC .......... *G06F 3/1205* (2013.01); *G06F 3/1258* (2013.01); *G06F 3/1279* (2013.01); *G06F 3/1284* (2013.01)

(58) Field of Classification Search
None
See application file for complete search history.

(56) References Cited

U.S. PATENT DOCUMENTS

| 2007/0234021 | A1* | 10/2007 | Ruberg | .................... G11C 8/16 |
| | | | | 712/244 |
| 2011/0157652 | A1* | 6/2011 | Suzuki | .................. G06F 3/1228 |
| | | | | 358/1.16 |
| 2021/0357157 | A1* | 11/2021 | Utsunomiya | ........... G06F 3/023 |

FOREIGN PATENT DOCUMENTS

JP    2009-160832 A    7/2009

* cited by examiner

*Primary Examiner* — Lennin R Rodriguezgonzalez
(74) *Attorney, Agent, or Firm* — Scully, Scott, Murphy & Presser, PC

(57) ABSTRACT

An image forming apparatus includes a housing having a first section and a second section opposite to the first section in a particular direction, a print engine, a user interface disposed at the first section, a memory interface having a plurality of ports including a first port disposed at the first section and a second port disposed at the second section, and a controller. The controller is configured to perform a storage printing process, prior to the storage printing process, set one of the plurality of ports as a dedicated port used in the storage printing process, when the second port is set as the dedicated port, determine whether the second port is in a notified status, and when determining that the second port is in the notified status, cause the user interface to display a notification screen.

16 Claims, 15 Drawing Sheets

IMAGE FORMING APPARATUS HAVING ONE OR MORE PORTS TO WHICH PORTABLE MEMORY IS ATTACHABLE

CROSS REFERENCE TO RELATED APPLICATIONS

This application claims priority under 35 U.S.C. § 119 from Japanese Patent Applications No. 2021-000483 and No. 2021-000525 that were filed on Jan. 5, 2021. The entire subject matter of the applications is incorporated herein by reference.

BACKGROUND

An image forming apparatus has been known that is configured to store print data according to received job data in a portable memory connected with the image forming apparatus and to perform printing based on the print data in response to an operation received via a user interface. Specifically, when the job data contains information specifying the portable memory as a storage destination, a controller of the image forming apparatus generates the print data from the job data and stores the generated print data in the portable memory.

SUMMARY

With respect to the known image forming apparatus, there is no sufficient disclosure about a status of the portable memory for storing the print data.

Aspects of the present disclosure are advantageous to provide one or more techniques to improve user-friendliness of an image forming apparatus having one or more ports to which a portable memory is removably attachable.

According to aspects of the present disclosure, an image forming apparatus is provided, which includes a housing, a print engine, a user interface, a memory interface, and a controller. The housing has a first section and a second section. The second section is located opposite to the first section in a particular direction. The user interface is disposed at the first section. The memory interface has a plurality of ports. Each of the plurality of ports is configured to receive a portable memory removably attached thereto. The plurality of ports include a first port disposed at the first section, and a second port disposed at the second section. The controller is configured to perform a storage printing process. The controller is further configured to, prior to the storage printing process, set one of the plurality of ports as a dedicated port used in the storage printing process. The controller is further configured to, when the second port is set as the dedicated port, cause the user interface to display a notification screen in response to determining that the second port is in a notified status.

According to aspects of the present disclosure, further provided is an image forming apparatus that includes a print engine, a user interface, a memory interface, and a controller. The memory interface has a port configured to receive a portable memory removably attached thereto. The controller is configured to perform a storage printing process. The controller is further configured to, prior to the storage printing process, set the portable memory attached to the port as a dedicated memory used to store print data in the storage printing process. The controller is further configured to, in response to receipt of a print instruction in the storage printing process, determine whether the portable memory set as the dedicated memory is set write-protected, before causing the print engine to perform printing according to the print data. The controller is further configured to, when determining that the portable memory set as the dedicated memory is set write-protected, cause the user interface to display a notification screen.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

With respect to the known image forming apparatus as described above, there is no sufficient disclosure about a configuration with a plurality of ports to which a portable memory is removably attachable. Furthermore, there is no sufficient disclosure about a status of a port or a portable memory attached to the port. An illustrative embodiment according to aspects of the present disclosure will be described with reference to the accompanying drawings. The illustrative embodiment presents an image forming apparatus with user-friendliness improved. In particular, the illustrative embodiment provides techniques to achieve improved user-friendliness of an image forming apparatus having one or more ports to which a portable memory is removably attachable.

Figure 1:
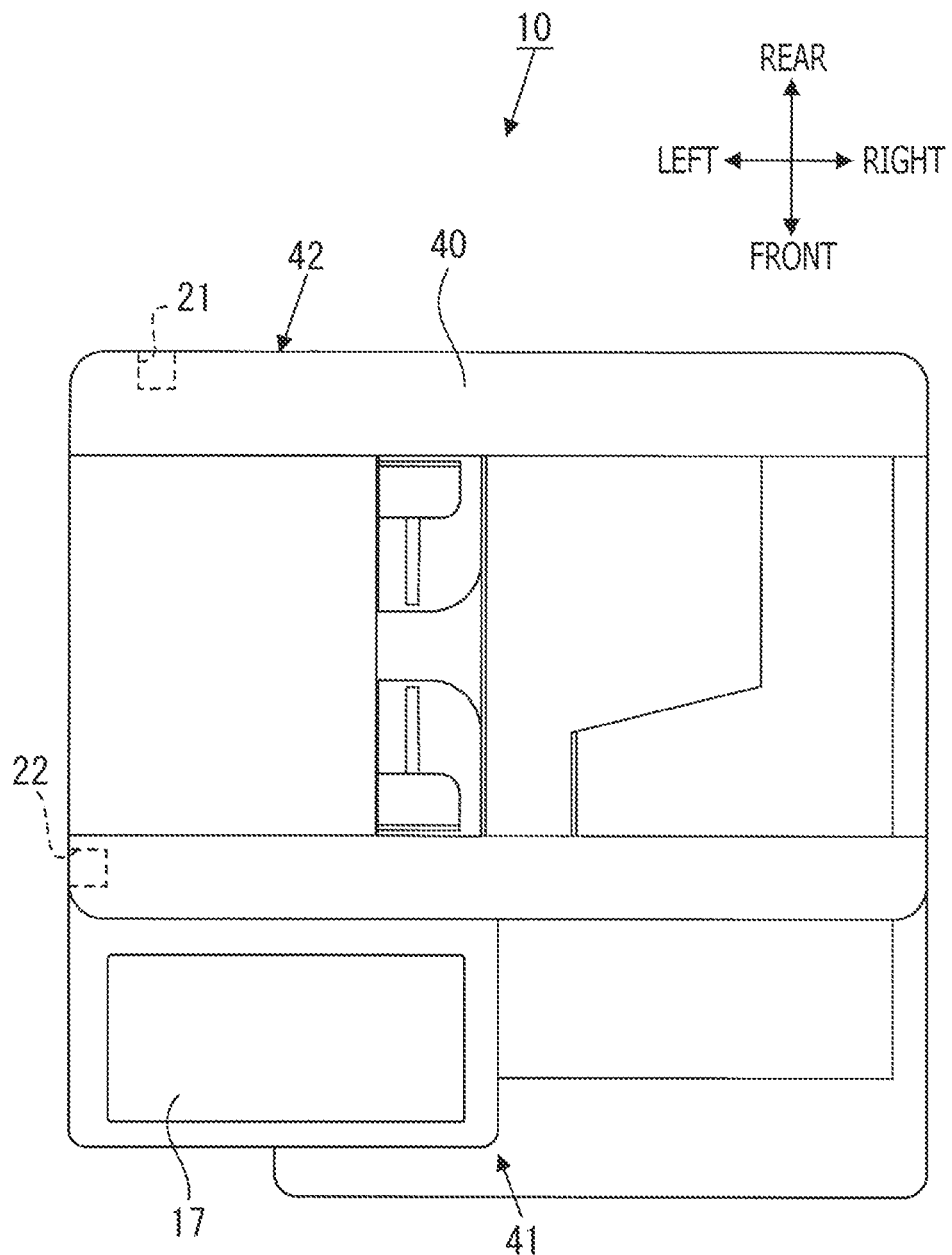
FIG. 1 is a top view of a multi-function peripheral (hereinafter referred to as an "MFP").
Figure 2:
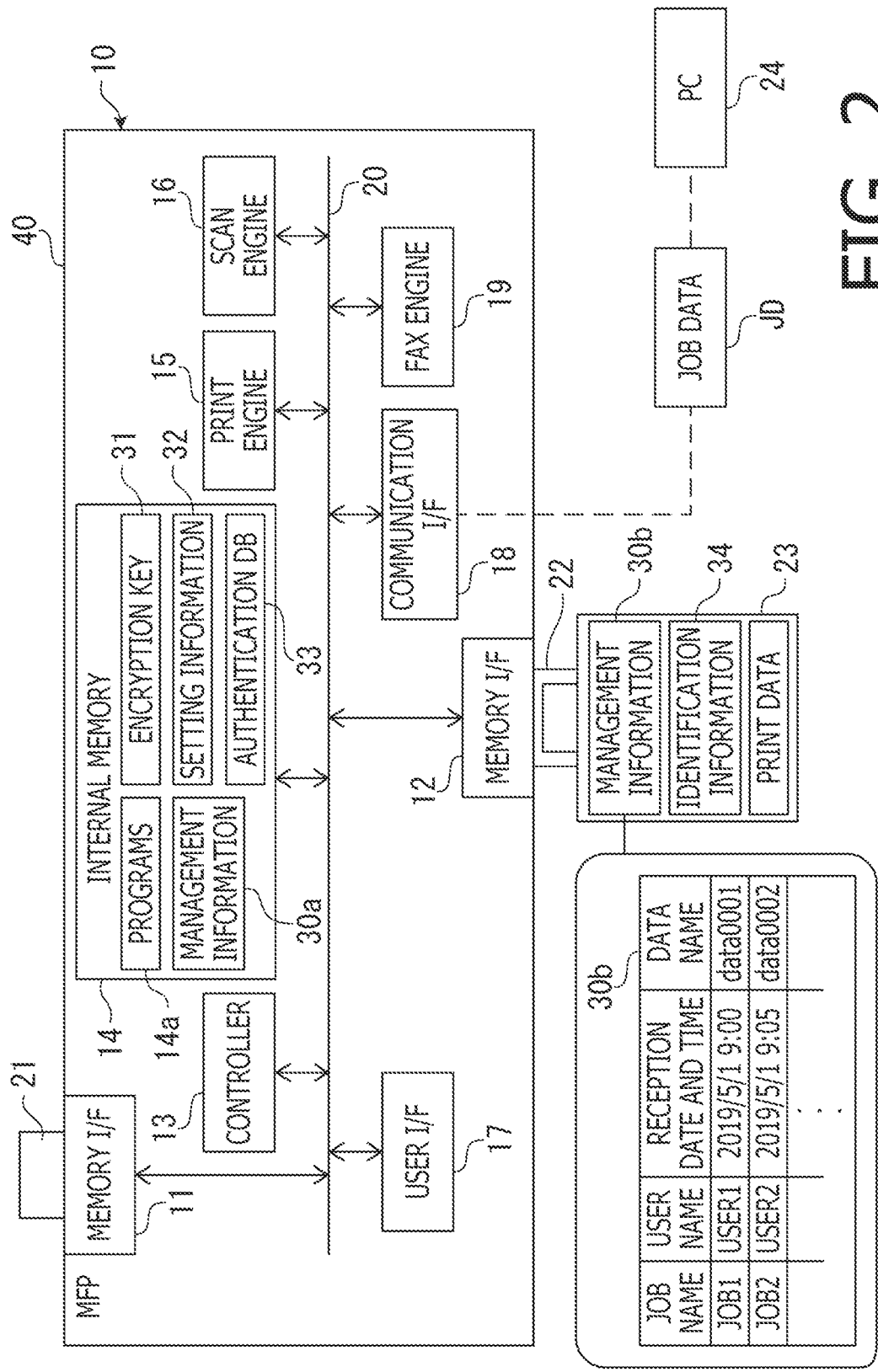
FIG. 2 is a block diagram showing a configuration of the MFP.

FIG. 1 is a top view of an MFP ("MFP" is an abbreviation for "Multi-Function Peripheral") 10 as an example of the image forming apparatus in the illustrative embodiment according to aspects of the present disclosure. FIG. 2 is a block diagram showing an electrical configuration of the MFP 10. The MFP 10 shown in FIGS. 1 and 2 is connected with a network 200, and is communicable with a PC 24 via the network 200. The MFP 10 may be connected with the network 200 (e.g., the Internet) in a wireless or wired manner. Examples of the network 200 may include, but are not limited to, the Internet, a LAN, and a USB ("USB" is an abbreviation for "Universal Serial Bus") wired connection between the MFP 10 and the PC 24.

As shown in FIG. 2, the MFP 10 includes memory I/Fs ("I/F" is an abbreviation for "interface") 11, 12, a controller 13, an internal memory 14, a print engine 15, a scan engine 16, a user I/F 17, a communication I/F 18, a fax engine 19, and a bus 20. These elements included in the MFP 10 are communicably interconnected via the bus 20.

The user I/F 17 is an interface that intervenes between a user who directly operates the MFP 10 and the controller 13. The user I/F 17 includes, for instance, a touch panel, and operable keys as physical keys. The communication I/F 18 is an interface for connecting the MFP 10 with the network 200. The print engine 15 is configured to print an image on a recording medium such as a sheet or a disk. Applicable recording methods for the print engine 15 may include, but are not limited to, an inkjet method, and an electrophotographic method. The MFP 10 may be configured to perform a combined operation as a combination of a plurality of operations.

The memory I/Fs 11 and 12 are interfaces configured to perform communication compliant with USB specifications. The memory I/Fs 11 and 12 have ports 21 and 22 to which a USB memory 23 is removably attachable, respectively. The USB specifications applicable in the illustrative embodiment may include, but are not limited to, USB 2.0 and USB 3.0. The USB memory 23 is a portable memory configured to be removably attached to the MFP 10 via a port. Examples of the USB memory 23 may include, but are not limited to, a USB-connectable HDD, and a memory card configured to communicate with the MFP 10 via a USB-connectable card reader. At least one of the memory I/Fs 11 and 12 may have, as a port, a card slot to which a memory card is removably attachable.

As shown in FIG. 1, the port 22 of the memory I/F 12 is located at a front section 41 where the user I/F 17 is disposed, of a housing 40 of the MFP 10. Specifically, when a side of the housing 40 on which the user I/F 17 is disposed is defined as a front side of the housing 40, the front section 41 is a section that includes the said front side and front-side portions of the left and right sides of the housing 40. Further specifically, the front section 41 may be defined as a section where the user I/F 17 is disposed when the housing 40 is divided into two equal sections in a front-to-rear direction. Moreover, when the housing 40 is regarded substantially as a cube, the front section 41 may be defined as a section that includes a front surface portion of the cube at which the user I/F 17 is disposed, and left-side and right-side portions in contact with the front surface portion of the cube. In other words, the front section 41 is such a section that it is easy for the user, who is in a position to face the user I/F 17, to visually recognize that the USB memory 23 is attached to the port 22 disposed at that section. In the illustrative embodiment, the port 22 is disposed at a left-side portion of the front section 41. The port 21 of the memory I/F 11 is disposed at a rear section 42 that is located opposite to the front section 41 in the front-to-rear direction of the housing 40. Specifically, the rear section 42 may be defined as a section where the user I/F 17 is not disposed when the housing 40 is divided into two equal sections in the front-to-rear direction. Moreover, the rear section 42 may be defined as a section that includes a rear surface portion which is located opposite to the front surface portion in the front-to-rear direction of the housing 40, and a part of the housing 40 not included in the left-side and right-side portions of the front section 41 that are in contact with the front surface portion. In other words, the rear section 42 is such a section that it is difficult for the user, who is in the position to face the user I/F 17, to visually recognize that the USB memory 23 is attached to the port 21 disposed at that section.

The print engine 15 is configured to discharge a printed sheet with an image formed thereon, in a discharge direction (specifically, in the frontward direction) along the front-to-rear direction shown in FIG. 1. Namely, the front side is a discharge side toward which the printed sheet is discharged. Further, in this case, the front section 41 may be defined as a half section of the housing 40 that is located on the discharge side in the discharge direction for the printed sheet. However, it is noted that the MFP 10 may be configured to change a setting for the discharge direction. Specifically, when the setting for the discharge direction is changed, a printed sheet with an image formed thereon by the print engine 15 may be discharged in the rearward direction along the front-to-rear direction. In this case, a rear cover (not shown) of the rear section 42 may be opened to discharge the printed sheet rearward. When the MFP 10 is set to discharge the printed sheet frontward, and the USB memory 23 is attached to the port 21 of the memory I/F 11 of the rear section 42, the USB memory 23 protrudes rearward from the housing 40. Namely, the memory I/F 11 is configured in such a manner that the USB memory 23, when attached to the port 21, protrudes from the housing 40 in a direction opposite to the discharge direction (i.e., the frontward direction). In another instance, the memory I/F 11 may be configured in such a manner that the USB memory 23, when attached to the port 21, protrudes from the housing 40 in a direction orthogonal to the discharge direction. In this case, when the housing 40 is divided into two equal sections in the left-to-right direction, the port 21 of the memory I/F 11 may be disposed at one section (e.g., a right section), of the two equal sections, which is located opposite in the left-to-right direction to the other section (e.g., a left section) where the port 22 of the memory I/F 12 is disposed. Further, the port 21 of the memory I/F 11 may be disposed at one section (e.g., the right section), of the two equal sections, which is located opposite to the other section (e.g., the left section) where the user I/F 17 having the touch panel is disposed, in the left-to-right direction.

The scan engine 16 is configured to convey a document sheet to be scanned, in a conveyance direction along the left-to-right direction. When viewed from the top of the housing 40, the scan engine 16 is located shifted toward the rear section 42 rather than the front section 41 relative to a center line of the housing 40 in the front-to-rear direction, which is orthogonal to the conveyance direction for the document sheet to be scanned. In this case, when viewed from the top of the housing 40, the port 21 of the memory I/F 11 is disposed at the rear section 42 toward which the scan engine 16 is shifted relative to the center line of the housing 40 in the front-to-rear direction.

The MFP 10 includes a sheet tray (not shown) configured to support one or more sheets placed thereon that are used for printing by the print engine 15. The sheet tray is configured to be pulled out in a pull-out direction (specifically, in the frontward direction) along the front-to-rear direction, to supply sheets. In this case, the port 21 of the memory I/F 11 is disposed at the rear section 42 that is located opposite to the front section 41 in the pull-out direction for the sheet tray.

The MFP 10 includes a front cover (not shown) disposed at the front section 41. The front cover is configured to be opened frontward for replacement of a toner cartridge for storing toner used for printing by the print engine 15. The toner cartridge to be replaced is withdrawn in a withdrawal direction (specifically, in the frontward direction) along the front-to-rear direction out of the housing 40 with the front cover being open. In this case, the port 21 of the memory I/F 11 is disposed at the rear section 42 that is located opposite to the front section 41 in the withdrawal direction in which the toner cartridge to be replaced is withdrawn.

The controller 13 may include at least one of processors such as a CPU and an ASIC ("ASIC" is an abbreviation for "Application Specific Integrated Circuit"). The internal memory 14 may include at least one of storage devices such as a RAM, a ROM, an SSD, and an HDD. The internal memory 14 may include a buffer of the controller 13 that is used in executing computer programs. The internal memory 14 may include a non-transitory computer-readable storage medium. Examples of the non-transitory computer-readable storage medium may include, but are not limited to, recording media such as a CD-ROM and a DVD-ROM, as well as the aforementioned various types of storages. Moreover, the non-transitory computer-readable storage medium is a tangible medium. On the other hand, an electrical signal carrying a program downloaded, e.g., from a server on the Internet, is a computer-readable signal medium, but is not included in the examples of the non-transitory computer-readable storage medium.

The internal memory 14 stores programs 14a executable by the controller 13. The illustrative embodiment basically shows processes to be performed by the controller 13 in accordance with instructions described in the programs 14a. Namely, each of processes such as "determining," "judging," "extracting," "selecting," "calculating," "specifying," "identifying," "obtaining," "acquiring," "receiving," "accepting," and "controlling" in the following description may represent a process by the controller 13. It is noted that "obtaining" or "acquiring" may be used as a concept that does not necessarily require a request. Namely, a process of receiving data without the controller 13 making a request for the data may be included in a concept of "the controller 13 obtaining (acquiring) data." Further, "data" in the present disclosure may be expressed in a computer-readable bit sequence. Additionally, a plurality of pieces of data having substantially the same meaning or content but expressed in different formats shall be treated as the same data. The same may apply to "information" in the present disclosure.

The internal memory 14 has a data storage area in which management information 30, encryption key 31, setting information 32, and authentication DB 33 are stored. The management information 30, the encryption key 31, the setting information 32 and the authentication DB 33 will be described later in detail. As will be described below, the "management information 30" is also stored in the USB memory 23. Therefore, when it is required to distinguish between the management information 30 stored in the internal memory 14 and the management information 30 stored in the USB memory 23, the alphabet characters "a," and "b" are added to the end of the reference numeral thereof. Namely, the management information stored in the internal memory 14 is represented with reference characters "30a" added, and the management information stored in the USB memory 23 is represented by reference characters "30b" added.

Next, a configuration of the PC 24 will be described. The PC 24 includes a communication I/F, a memory, and a controller, which are not shown in any of the drawings. Respective configurations of the above elements included in the PC 24 are substantially the same as those of the communication I/F 18, the internal memory 14, and the controller 13 included in the MFP 10. The PC 24 may generate job data JD by a function of an application program stored in the memory. The job data JD is data for causing the MFP 10 to perform printing. In the illustrative embodiment, the job data JD contains PJL ("PJL" is an abbreviation for "Printer Job Language") data and PDL ("PDL" is an abbreviation for "Page Description Language") data. The PJL data is data described in Printer Job Language. The PDL data is data described in Page Description Language. Examples of the PDL data may include, but are not limited to, PS ("PS" is an abbreviation for "Post Script") data, PCL ("PCL" is an abbreviation for "Printer Command Language") data, JPEG ("JPEG" is an abbreviation for "Joint Photographic Experts Group") data, and GDI ("GDI" is an abbreviation for "Graphic Device Interface") data.

Figure 3A:
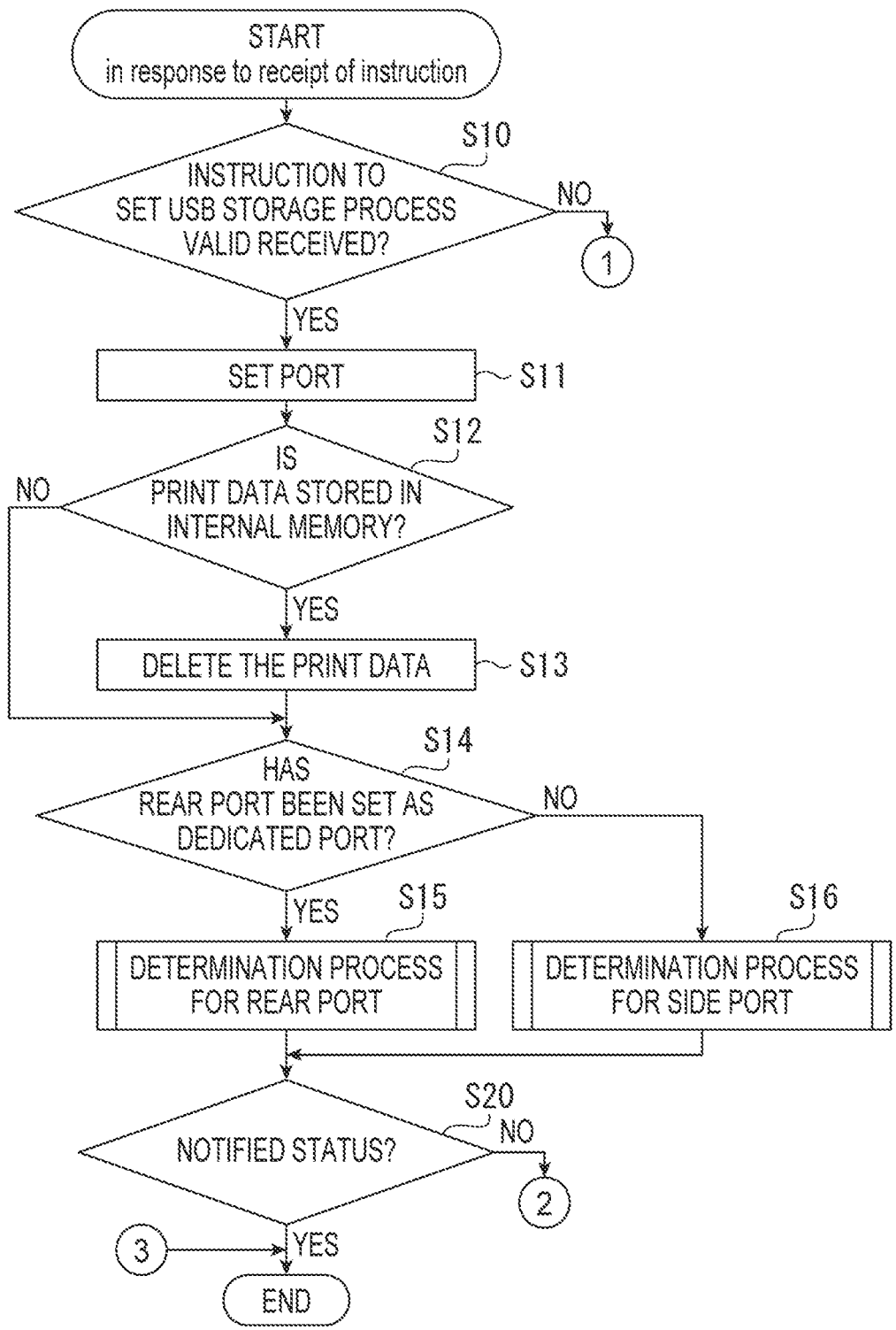
FIGS. 3A and 3B are flowcharts showing a procedure of a process to set a memory as a storage destination for print data.
Figure 3B:
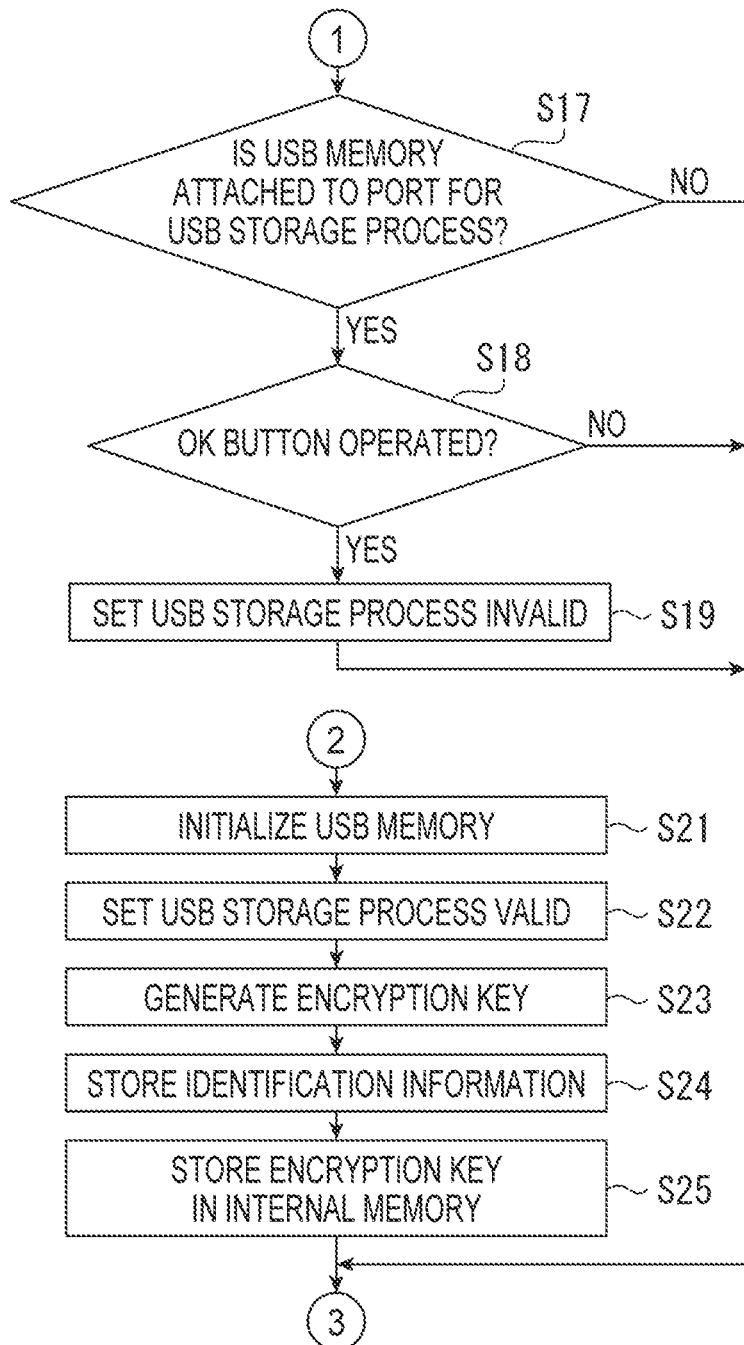

Referring to FIGS. 3A and 3B, an explanation will be provided of a procedure of a process to set a memory as a storage destination in a storage printing function. The storage printing function is a function to store print data corresponding to received job data JD in a memory set as a storage destination, and cause the print engine 15 to print the print data stored in the memory set as the storage destination in response to an operation received via the user I/F 17. The storage printing function includes a first storage printing function for job data JD with a PIN code and a second storage printing function for job data JD with a user name. The first storage printing function is set valid at the time of factory shipment of the MFP 10. The second storage printing function is switchable to be valid or invalid in response to an external instruction. When having switched the second storage printing function to be valid in response to a user instruction, the controller 13 sets the first storage printing function invalid. Meanwhile, when having switched the second storage printing function to be invalid in response to a user instruction, the controller 13 sets the first storage printing function valid. In the storage printing function, when a USB storage process is set valid, the print data may be stored in the USB memory 23. On the other hand, when the USB storage process is set invalid, the print data may be stored in the internal memory 14.

Referring to FIGS. 3A and 3B, an example case will be described in which the side port 22 is set as a port to which the USB memory 23 as a storage destination is to be attached. The process shown in FIGS. 3A and 3B may be performed by the controller 13 executing one or more programs 14a stored in the internal memory 14. The controller 13 performs the process shown in FIGS. 3A and 3B in response to receipt of an instruction to make a transition of the display on the user I/F 17 to a setting screen for the storage printing function in response to an operation onto a standby screen 50 shown in FIG. 4. The standby screen 60 is a screen for receiving selection instructions for various functions of the MFP 10. The standby screen 50 is displayed on the user I/F 17 to wait for an instruction to be input, after the MFP 10 is powered on or after completion of each function executed by the MFP 10.

First, an explanation will be provided of an example situation where the USB storage process is switched from an invalid status to a valid status. In the following description, each step included in each process will be represented with "S" added in front of a corresponding reference numeral. In S10, the controller 13 determines whether to set the USB storage process valid. Specifically, after making a transition of the display on the user I/F 17 from the standby screen 50 to the setting screen for the storage printing function, in response to receiving an instruction to set the USB storage process valid via the setting screen, the controller 13 determines to set the USB storage process valid (S10: Yes).

Figure 5:
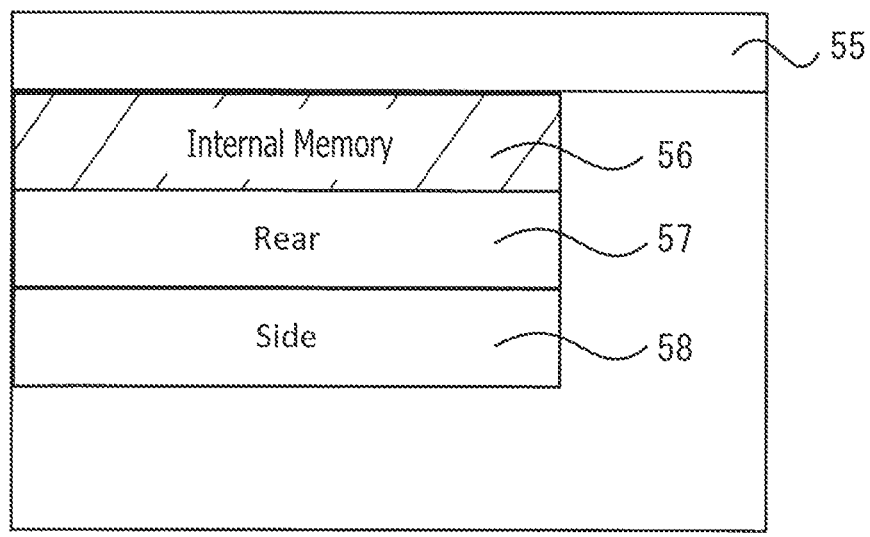
FIG. 5 shows an example of a storage destination setting screen displayed on the MFP.

When determining to set the USB storage process valid (S10: Yes), the controller 13 proceeds to S11. In S11, the controller 13 sets a port to which the USB memory 23 as a storage destination for print data is to be attached. Specifically, the controller 13 displays a storage destination setting screen 55 (see FIG. 5) in response to an operation onto the user I/F 17. The storage destination setting screen 55 includes designation buttons 56, 57, and 58 to receive a selection from among available storage destinations for print data, i.e., the internal memory 14 (indicated with "Internal Memory" in FIG. 5), the port 21 (indicated with "Rear" in FIG. 5), and the port 22 (indicated with "Side" in FIG. 5). Each of the designation buttons 56, 57, and 58 is a button to be operated to select a corresponding one of the available storage destinations for print data. A designation button corresponding to a currently-set storage destination is displayed in a different color from a color of the other designation buttons. In FIG. 5, the designation button 56 displayed in the different color is indicated as a shaded area. The setting information 32 is updated according to the operation of the designation buttons 56, 57, and 58. The setting information 32 is information indicating the internal memory 14 or a port (i.e., the "Rear" port 21 or the "Side" port 22) to which the USB memory 23 set as the storage destination for print data is to be attached.

In S12, the controller 13 determines whether print data is stored in the internal memory 14 that had been set as the storage destination before the port setting in S11. When determining that no print data is stored in the internal memory 14 (S12: No), the controller 13 proceed to S14. Meanwhile, when determining that print data is stored in the internal memory 14 (S12: Yes), the controller 13 proceed to S13 to delete the print data stored in the internal memory 14.

Figure 6:
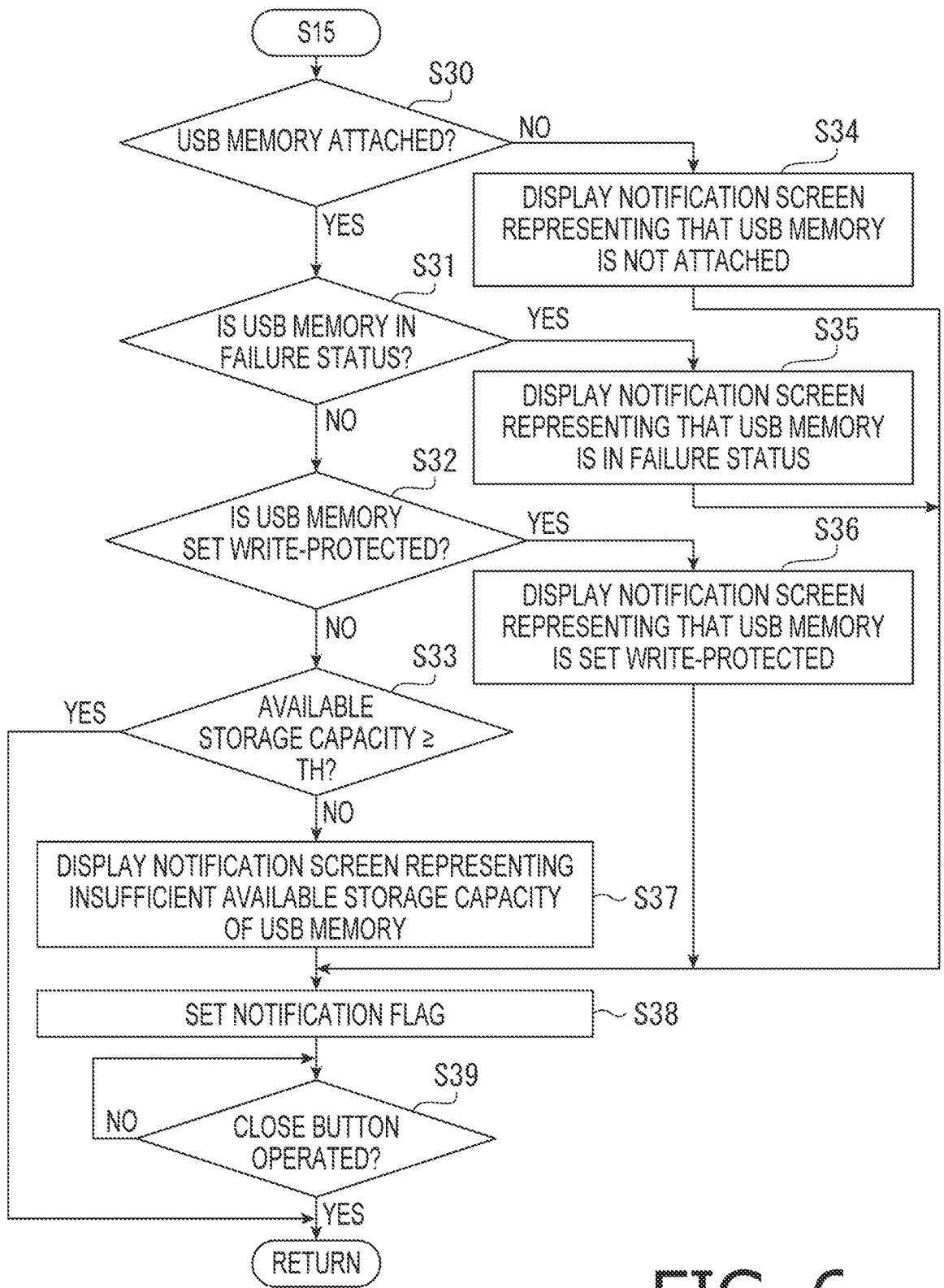
FIG. 6 is a flowchart showing a procedure of a process to determine a notified status for a rear port.

In S14, the controller 13 determines whether the rear port 21 has been set, in S11, as the port to which the USB memory 23 for storing the print data is to be attached. Specifically, the controller 13 determines whether the setting information 32 stored in the internal memory 14 represents that the rear port 21 is currently set to a dedicated port. When determining that the rear port 21 has been set, in S11, as the port to which the USB memory 23 for storing the print data is to be attached (S14: Yes), the controller 13 proceeds to S15 to perform a determination process for the rear port 21. The process to be performed by the controller 13 in S15 will be described in detail with reference to FIG. 6.

Figure 7:
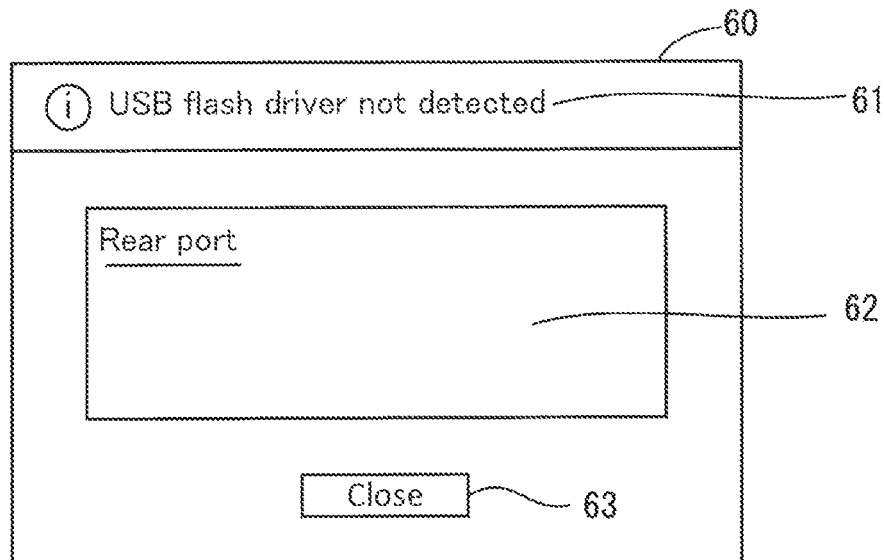
FIG. 7 shows an example of a notification screen representing that no USB memory is attached to the rear port.

In S30, the controller 13 determines whether the USB memory 23 is attached to the rear port 21. When determining that the USB memory 23 is not attached to the rear port 21 (S30: No), the controller 13 proceeds to S34. In S34, the controller 13 causes the user I/F 17 to display a notification screen 60 (see FIG. 7). The notification screen 60 shown in FIG. 7 includes a message 61 indicating a cause (i.e., what to be notified via the notification screen 60) for the notification screen 60 to be displayed, a message body 62, and a close button 63. More specifically, the message 61 represents that the attachment of a USB memory to the rear port 21 has not been detected. The message body 62 contains a message representing that the notification screen 60 is for the rear port 22. For instance, it is assumed that a user who is trying to set the side port 22 as the dedicated port operates the designation button 58 and attaches the USB memory 23 to the side port 22. However, the user might mistakenly operate the designation button 57. In S34, the controller 13 provides, via the notification screen 60, a notification that any USB memory is not attached to the rear port 21. Thereby, the user is allowed to realize that the user has not selected the side port 22 with the USB memory 23 attached. The user, after seeing the massages 61 and 62, may operate the designation button 58. Of course, the messages 61 and 62 are also useful when the user has mistakenly attached the USB memory 23 to the side port 22 even with the intention of using the rear port 21.

Figure 8:
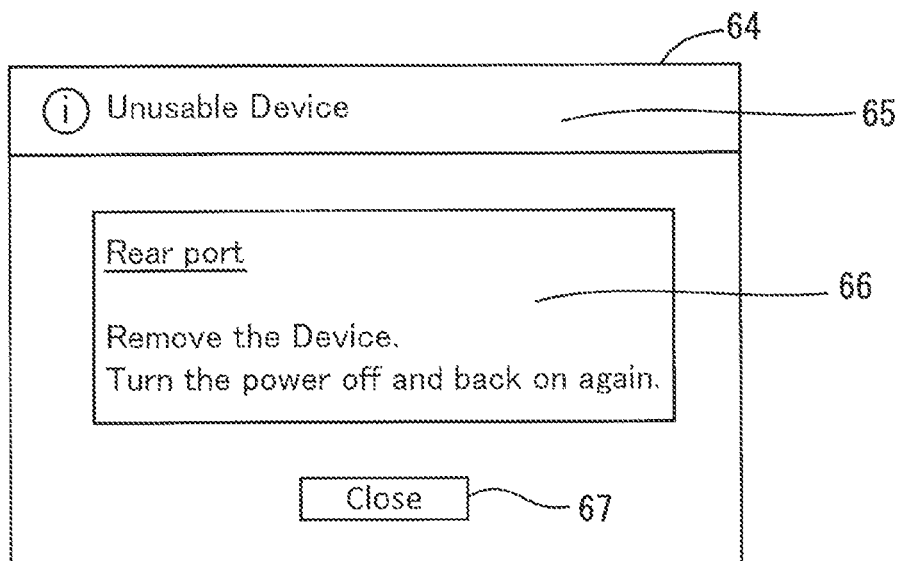
FIG. 8 shows an example of a notification screen representing that a USB memory attached to the rear port is unusable.

When determining that the USB memory 23 is attached to the rear port 21 (S30: Yes), the controller 13 proceeds to S31. In S31, the controller 13 determines whether the USB memory 23 attached to the rear port 21 is in a failure status where it is impossible to access the USB memory 23. When determining that the USB memory 23 attached to the rear port 21 is in the failure status (S31: Yes), the controller 13 proceeds to S35. In S35, the controller 13 causes the user I/F 17 to display a notification screen 64 (see FIG. 8). The notification screen 64 shown in FIG. 8 includes a message 65 indicating a cause (i.e., what to be notified via the notification screen 64) for the notification screen 64 to be displayed, a message body 66, and a close button 67. More specifically, the message 65 represents that the USB memory 23 attached to the rear port 21 is unable to be used in the USB storage process. The message body 66 includes a message that the notification screen 64 is for the rear port 21, and a message for prompting the user to remove the USB memory 23, and turn a main power of the MFP 10 off and back on again. Thereby, the user is allowed to realize that the user needs to remove the USB memory 23 from the rear port 21, turn the main power of the MFP 10 off and back on again, and that the USB memory 23 attached to the rear port 21 needs to be replaced with a USB memory not in the failure status.

When determining that the USB memory 23 attached to the rear port 21 is not in the failure status (S31: No), the controller 13 proceeds to S32. In S32, the controller 13 determines whether the USB memory 23 attached to the rear port 21 is set write-protected. The write-protect is a setting for prohibiting writing data into or deleting data from the USB memory 23. In the illustrative embodiment, the USB memory 23 may have an operable switch configured to, when operated, switch between a state where the USB memory 23 is set write-protected and a state where the USB memory 23 is not set write-protected. A reason for executing S32 is that when the USB memory 23 is set write-protected, even if the USB memory 23 is set as the storage destination for print data, it is impossible to store the print data into the USB memory 23 or to initialize the USB memory 23 in a below-mentioned step S21. When determining that the USB memory 23 attached to the rear port 21 is set write-protected (S32: Yes), the controller 13 proceeds to S36 to cause the user I/F 17 to display a notification screen 68 (see FIG. 9).

Figure 9:
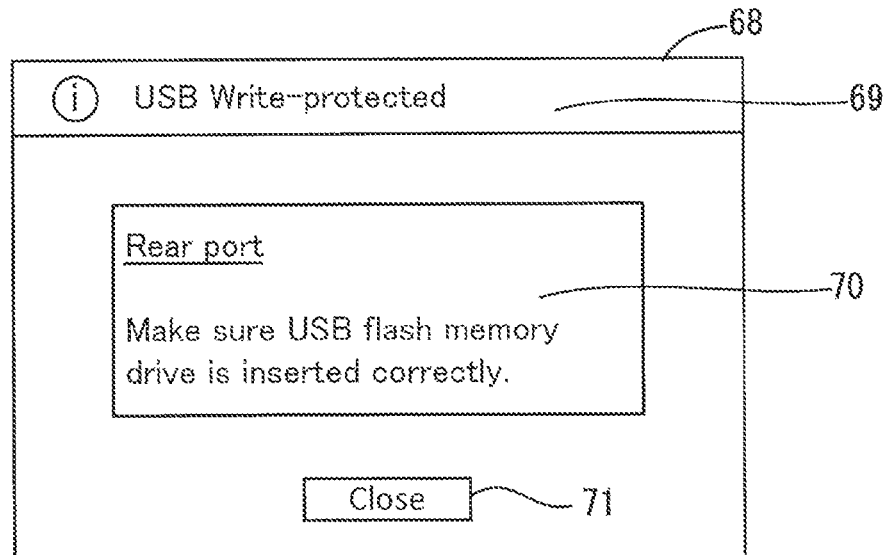
FIG. 9 shows an example of a notification screen representing that the USB memory attached to the rear port is set write-protected.

The notification screen 68 shown in FIG. 9 includes a message 69 indicating a cause (i.e., what to be notified via the notification screen 68) for the notification screen 68 to be displayed, a message body 70, and a close button 71. More specifically, the message 69 represents that the USB memory 23 attached to the rear port 21 is set write-protected. The message body 70 contains a message representing that the notification screen 68 is for the rear port 21 and a message for prompting the user to confirm that the USB memory 23 is inserted correctly. Thereby, the user is allowed to recognize that the USB memory 23 attached to the rear port 21 is set write-protected. Furthermore, it is possible to prompt the user to cancel the write-protect setting for the USB memory 23 or to re-attach another USB memory that is not set write-protected to the rear port 21.

When determining that the USB memory 23 attached to the rear port 21 is not set write-protected (S32: No), the controller 13 proceeds to S33. In S33, the controller 13 determines whether an available storage capacity of the USB memory 23 attached to the rear port 21 is equal to or more than a threshold TH. This is because there is a concern that if the available storage capacity of the USB memory 23 to be used in the USB storage process is small, the USB memory 23 may be unable to sufficiently store the print data. Namely, there is a concern that an insufficient storage capacity of the USB memory 23 may cause a trouble in the use of the storage printing function. This is also because if the available storage capacity of the USB memory 23 is small, it may cause a larger number of read/write operations per unit storage area of the USB memory 23 and may result in a higher risk of causing a failure of the USB memory 23. For instance, the threshold TH used for the determination in S33 is 8 GB.

Figure 10:
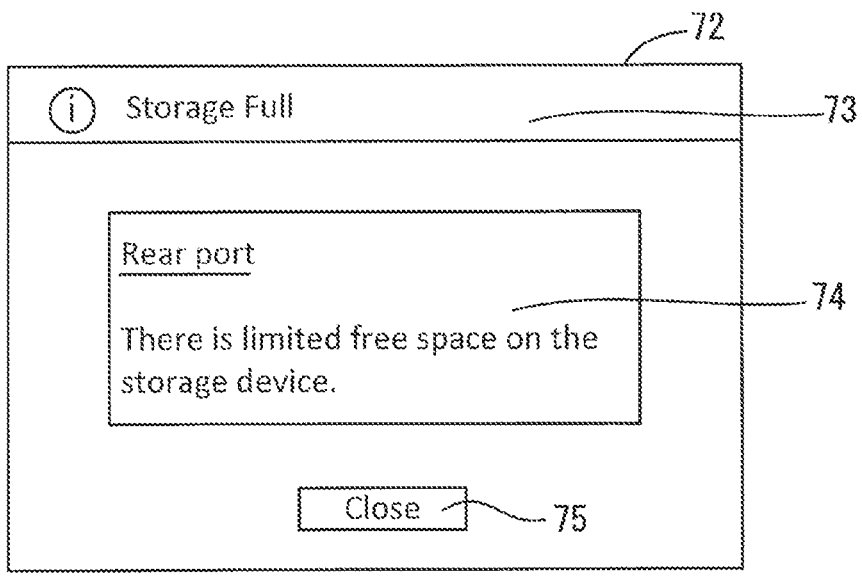
FIG. 10 shows an example of a notification screen representing that an available storage capacity of the USB memory attached to the rear port is insufficient.

When determining that the available storage capacity of the USB memory 23 attached to the rear port 21 is less than the threshold TH (S33: No), the controller 13 proceeds to S37. In S37, the controller 13 causes the user I/F 17 to display a notification screen 72 (see FIG. 10). The notification screen 72 shown in FIG. 10 includes a message 73 indicating a cause (i.e., what to be notified via the notification screen 72) for the notification screen 72 to be displayed, a message body 74, and a close button 75. More specifically, the message 73 indicates an insufficient available storage capacity of the USB memory 23 attached to the rear port 21. The message body 74 contains a message representing that the notification screen 72 is for the rear port 21 and a message representing that the available storage capacity of the USB memory 23 is insufficient. Thereby, the user is allowed to realize that the available storage capacity of the USB memory 23 attached to the rear port 21 is small. Further, it is possible to prompt the user to re-attach a new USB memory 23 with a sufficient available storage capacity to the rear port 21.

After completing one of the steps S34, S35, S36, and S37, the controller 13 proceeds to S38. In S38, the controller 13 sets a notification flag to a value indicating a notified status for the rear port 21 (i.e., a value indicating that the rear port 21 is in the notified status), and stores the set notification flag in the internal memory 14. In S39, the controller 13 determines whether an operation of the close button has been detected on any of the notification screens 60, 64, 68, and 72. When determining that the operation of the close button has not been detected (S39: No), the controller 13 waits until the close button is operated on the corresponding notification screen. Meanwhile, when determining that the operation of the close button has been detected (S39: Yes), the controller 13 proceeds to S20 in FIG. 3A. Further, when determining that the available storage capacity of the USB memory 23 attached to the rear port 21 is equal to or more than the threshold TH (S33: Yes), the controller 13 proceeds to S20 in FIG. 3A.

On the other hand, when determining that the side port 22 has been set as the port to which the USB memory 23 for storing the print data is to be attached (S14: No), the controller 13 proceeds to S16. In S16, the controller 13 determines whether the side port 22 is in the notified status. Each process included in S16 is substantially the same as each corresponding process described with reference to FIG. 6, but is different in that the target port is the side port 22 instead of the rear port 21. After completion of S16, the controller 13 proceeds to S20.

In S20, the controller 13 determines whether the value of the notification flag indicates the notified status for the target port (specifically, in this case, the target port is the port, set as the dedicated port, of the ports 21 and 22). When determining that the value of the notification flag does not indicate the notified status for the target port (S20: No), the controller 13 proceeds to S21 to initialize the USB memory 23 attached to the target port. For instance, in S21, the controller 13 may delete all data in the USB memory 23. The controller 13 may format the storage area of the USB memory 23. Prior to the initialization of the USB memory 23 in S21, the controller 13 may cause the user I/F 17 to display a confirmation screen to confirm that the USB memory 23 is to be initialized. In this case, in response to receipt of an instruction to select the initialization of the USB memory 23 via the confirmation screen, the controller 13 may proceed to S21. Meanwhile, when an instruction to select the initialization of the USB memory 23 has not been received via the confirmation screen, the controller 13 may terminate the process shown in FIGS. 3A and 3B.

In S22, the controller 13 sets the USB storage process valid. To set the USB storage process valid, the controller 13 sets a validity determination flag representing the status of the USB storage process to a value representing that the USB storage process is set valid, and stores the set validity determination flag in the internal memory 14. In S23, the controller 13 generates an encryption key 31. The encryption key 31 is information used to encrypt and decrypt the print data and the management information 30 stored in the USB memory 23 attached to the target port. Each time the USB storage process is set valid, the controller 13 generates a new encryption key.

In S24, the controller 13 stores the identification information 34 in the USB memory 23 attached to the target port. The identification information 34 is information representing that the USB memory 23 with the identification information 34 stored therein is set as the storage destination for print data in the USB storage process. Specifically, the controller 13 generates the management information 30b, and encrypts the management information 30b with the encryption key 31 generated in S23, thereby generating the identification information 34. It is noted that the management information 30b encrypted in S24 does not contain any information recorded about the print data. Hereinafter, the USB memory 23, which has been set as the storage destination for print data by the identification information 34 being stored therein, may be referred to simply as a "dedicated memory," to differentiate it from another USB memory 23.

In S25, the controller 13 stores, into the internal memory 14, the encryption key 31 used to generate the identification information 34 in S24. Namely, the encryption key 31 is information paired with the identification information 34. After completion of S25, the controller 13 terminates the process shown in FIGS. 3A and 3B.

When determining that the value of the notification flag indicates the notified status for the target port (S20: Yes), the controller 13 terminates the process shown in FIGS. 3A and 3B. In this case, the controller 13 causes the user I/F 17 to display a standby screen 50 shown in FIG. 4. The user may input an instruction to make a transition of the display on the user I/F 17 to the setting screen for the storage printing function by operating the standby screen 50, after or in order to cancel the notified status. Then, the user may input an instruction to set the USB storage process valid again. For instance, when no USB memory 23 is attached to the rear port 21, and the notification screen 60 is displayed in S15, if the user mistakenly operates the designation button 57 even though the user has attached the USB memory 23 to the side port 22, the user may operate the designation button 58, thereby re-designating the side port 22. During the next execution of the process shown in FIGS. 3A and 3B, the controller 13 determines that the value of the notification flag does not indicate the notified status for the target port (S20: No), and sets the USB storage process valid.

Next, an explanation will be provided of an example situation where the USB storage process is switched from the valid status to the invalid status. When determining not to set the USB storage process valid (S10: No), more specifically, when having received an instruction to set the USB storage process invalid via the setting screen for the storage printing function, the controller 13 proceeds to S17. In S17, the controller 13 determines whether the USB memory 23 is attached to the port currently set to be used in the USB storage process. When determining that the USB memory 23 is attached to the port currently set to be used in the USB storage process (S17: Yes), the controller 13 proceeds to S18 to display a confirmation screen. The confirmation screen includes a message representing that all the data in the USB memory 23 is to be deleted and that the role of the USB memory 23 as the storage destination for print data is to be set invalid. The confirmation screen further includes an OK button to receive an instruction to start initializing the USB memory 23, and a cancel button to receive an instruction to cancel the initialization of the USB memory 23.

In response to detecting in S18 that the OK button on the confirmation screen has been operated (S18: Yes), the controller 13 proceeds to S19. In S19, the controller 13 initializes the USB memory currently attached to the port by deleting all the data stored in the USB memory 23 that contains the print data and the management information 30b, thereby setting the USB storage process invalid. Further, the controller 13 changes the value of the validity determination flag stored in the internal memory 14 to a value representing that the USB storage process is set invalid. Moreover, the controller 13 changes the value of the setting information 32 from the port 21 or 22 to the internal memory 14. Thereby, the internal memory 14 is set as the storage destination for print data in the storage printing function. It is noted that in S19, the controller 13 may delete only the print data and the management information 30 among all the data stored in the USB memory 23. In another instance, in S19, to set the USB storage process invalid, the controller 13 may move the print data and the management information 30 into the internal memory 14 instead of deleting the print data and the management information 30 stored in the USB memory 23. After completion of S19, the controller 13 terminates the process shown in FIGS. 3A and 3B.

In substantially the same manner as setting the USB storage process invalid in S19, to switch a currently-invalid one of the first and second storage printing functions to be valid while setting invalid the other function of them, the controller 13 deletes the print data stored in the USB memory 23 in the other function to be set invalid. The first and second storage printing functions are different in that information necessary for the first storage printing function in a below-mentioned step S67 is the PIN code whereas information necessary for the second storage printing function in S67 is the user name. Therefore, if the print data remains stored in the USB memory 23, it may produce such a negative effect that some print data remains unprintable. In this case, the information indicating the dedicated port and the dedicated memory is not deleted. Thus, even after switching one of the first and second storage printing functions to be valid while setting invalid the other function of them, it is possible to use the already-set USB storage process as is.

Next, a process to be performed in response to the MFP 10 receiving the job data JD in a state where the storage printing function is set valid will be described with reference to FIG. 11. Specifically, when the first storage printing function is valid, the controller 13 starts a process shown in FIG. 11 in response to detecting that the job data JD with the PIN code added has been received. When the second storage printing function is valid, the controller 13 starts the process shown in FIG. 11 in response to detecting that the job data JD with the user name added has been received.

In S40, the controller 13 determines whether the USB storage process is set valid. Specifically, as described above, the controller 13 determines the USB storage process is set valid, based on the validity determination flag stored in the internal memory 14.

When determining that the USB storage process is set valid (S40: Yes), the controller 13 proceeds to S44. In S44, the controller 13 determines whether the rear port 21 is set as the dedicated port, in substantially the same manner as in S14. When determining that the rear port 21 is set as the dedicated port (S44: Yes), the controller 13 proceeds to S45. In S45, the controller 13 determines what status the USB memory 23 attached to the rear port 21 is in, according to substantially the same procedure as the procedure of S15 (see FIG. 3A), and displays substantially the same messages as shown in FIGS. 7 to 10 as needed. When the USB storage process has been set valid, the status of the dedicated port has already been determined according to the procedure of S15. However, in the USB storage process, even when the dedicated memory, after removed from the dedicated port, is re-attached to the dedicated port, it is possible to store the print data in the dedicated memory attached to the dedicated port. Therefore, the controller 13 makes the determination of S45 just in case since it is concerned that the USB memory 23 removed from the dedicated port might be set write-protected or that the dedicated memory might mistakenly be left removed from the dedicated port. Meanwhile, when the side port 22 is set as the dedicated port (S44: No), the controller 13 proceeds to S46 to execute substantially the same procedure as the procedure of S16 (see FIG. 3A).

After completion of S45 or S46, the controller 13 proceeds to S47 to determine whether the dedicated port is currently in the notified status. Namely, in S47, the controller 13 determines whether or not the dedicated port is currently in a state where the print data is unable to or should not be stored via the dedicated port. More specifically, the controller 13 determines whether the dedicated port is currently in the notified status, based on the value of the notification flag set in S45 or S46. When determining that the dedicated port is not currently in the notified status (S47: No), the controller 13 proceeds to S48. In S48, the controller 13 performs RIP processing to convert the job data JD into the print data. Specifically, in S48, the controller 13 rasterizes the PDL data contained in the job data JD, thereby generating the print data.

In S49, the controller 13 compresses the print data generated in S48, then encrypts the compressed print data, and stores the encrypted print data in the dedicated memory. At this time, using the encryption key 31 generated in S23 (see FIG. 3B), the controller 13 encrypts the print data, for instance, in such a format that the encrypted print data is unable to be processed in below-described "Direct Print," and then saves the encrypted print data.

In S50, the controller 13 reads out the management information 30b from the dedicated memory, decrypts the read management information 30b, and adds information corresponding to the job data JD received this time to the decrypted management information 30b. Specifically, the controller 13 decrypts the management information 30b stored in the USB memory 23, using the encryption key 31. When the first storage printing function is set valid, a job name, a data name, and reception date and time are stored as a single record in the management information 30b in association with the PIN code contained in the job data JD. On the other hand, when the second storage printing function is set valid, the job name, the data name, and the reception date and time are stored as a single record in the management information 30b in association with the user name contained in the job data JD. Thereby, the MFP 10 is enabled to manage each record in the management information 30b in association with corresponding print data stored in the internal memory 14. After completion of S50, the controller 13 terminates the process shown in FIG. 11.

When determining that the dedicated port is currently in the notified status (S47: Yes), the controller 13 proceeds to S51 to discard the job data received this time. After completion of S51, the controller 13 terminates the process shown in FIG. 11. It is noted that in S51, instead of discarding the job data JD received this time, the controller 13 may store the received job data JD or the print data generated from the job data JD into the internal memory 14 in response to a user's instruction. In this case, the controller 13 may display an error screen on the user I/F 17 or the PC 24.

After discarding the received job data in S51, the controller 13 causes the user I/F 17 to display the standby screen 50. The user may resolve the notified status, and then operate the PC 24 to re-transmit the print data to the MFP 10. For instance, if the dedicated memory is set write-protected, the user may cancel the write-protect setting for the dedicated memory, and then operate the PC 24 to send the job data JD to the MFP 10. Thereby, during the next execution of the process shown in FIG. 11, the controller 13 determines that the dedicated port is not currently in the notified status (S47: No), proceeds to S48, and executes S48 to S50, thereby storing the print data in the dedicated memory.

When determining in S40 that the USB storage process is set invalid (S40: No), the controller 13 proceeds to S41. In S41, the controller 13 performs RIP processing for the received job data JD. The RIP processing to be performed in S41 is substantially the same processing as performed in S48.

In S42, the controller 13 stores the print data generated this time in the internal memory 14. Namely, unlike S49, the controller 13 does not encrypt the print data in S42. In S42, the controller 13 may reduce the data volume of the print data by compressing the print data, and then store the compressed print data in the internal memory 14. In S43, the controller 13 adds information corresponding to the print data generated this time to the management information 30a stored in the internal memory 14. In S43 as well, depending on whether the second storage printing function is set valid or invalid, the job name, the data name, and the reception date and time are stored as a single record in the management information 30a in association with the user name or the PIN code. Specifically, when the first storage printing function is set valid, the job name, the data name, and the reception date and time are stored as a single record in the management information 30a in association with the PIN code contained in the job data JD. On the other hand, when the second storage printing function is set valid, the job name, the data name, and the reception date and time are stored as a single record in the management information 30a in association with the user name contained in the job data JD. After completion of S43, the controller 13 terminates the process shown in FIG. 11.

Figure 12A:
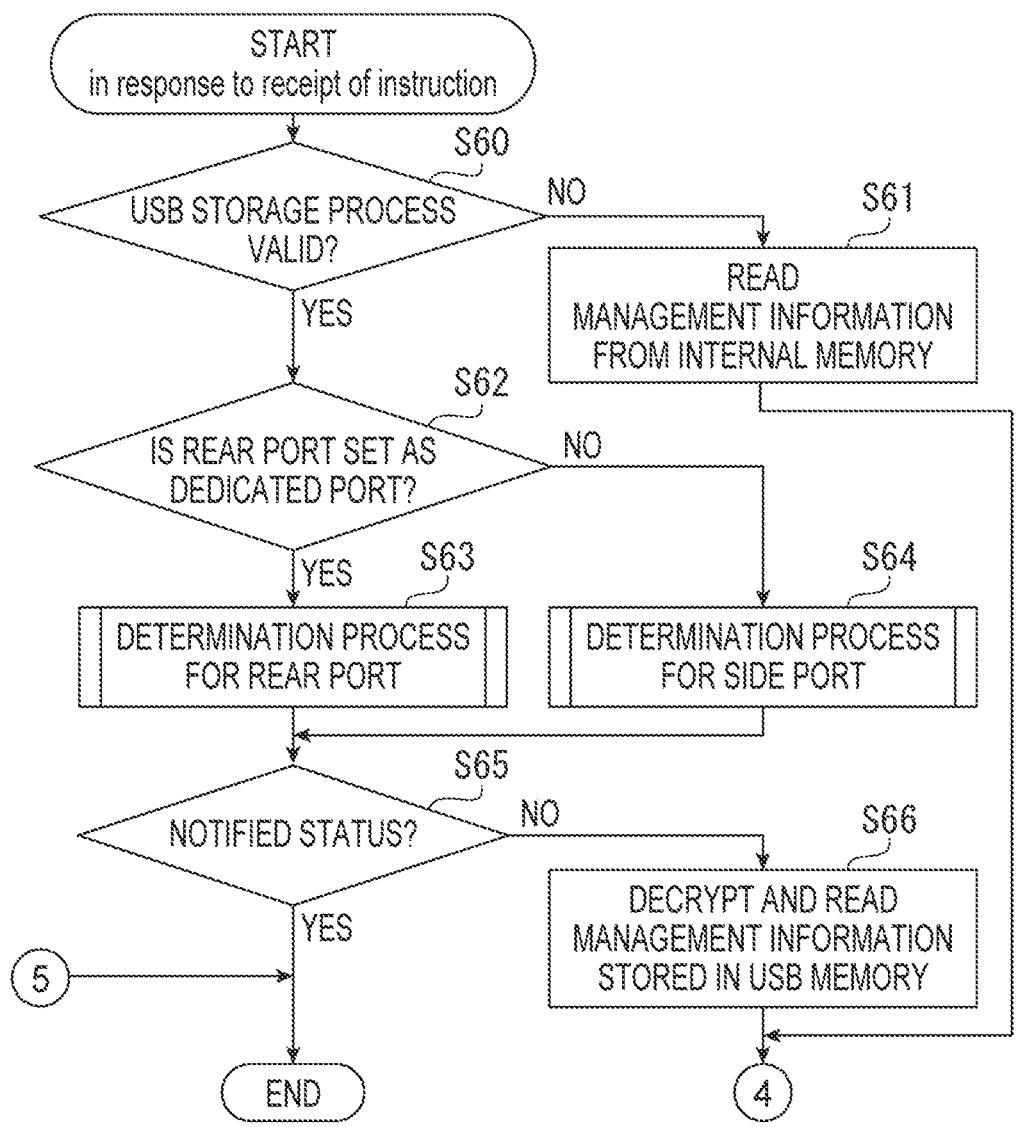
FIGS. 12A and 12B are flowcharts showing a procedure of a process to print the print data among the processes pertaining to the storage printing function.
Figure 12B:
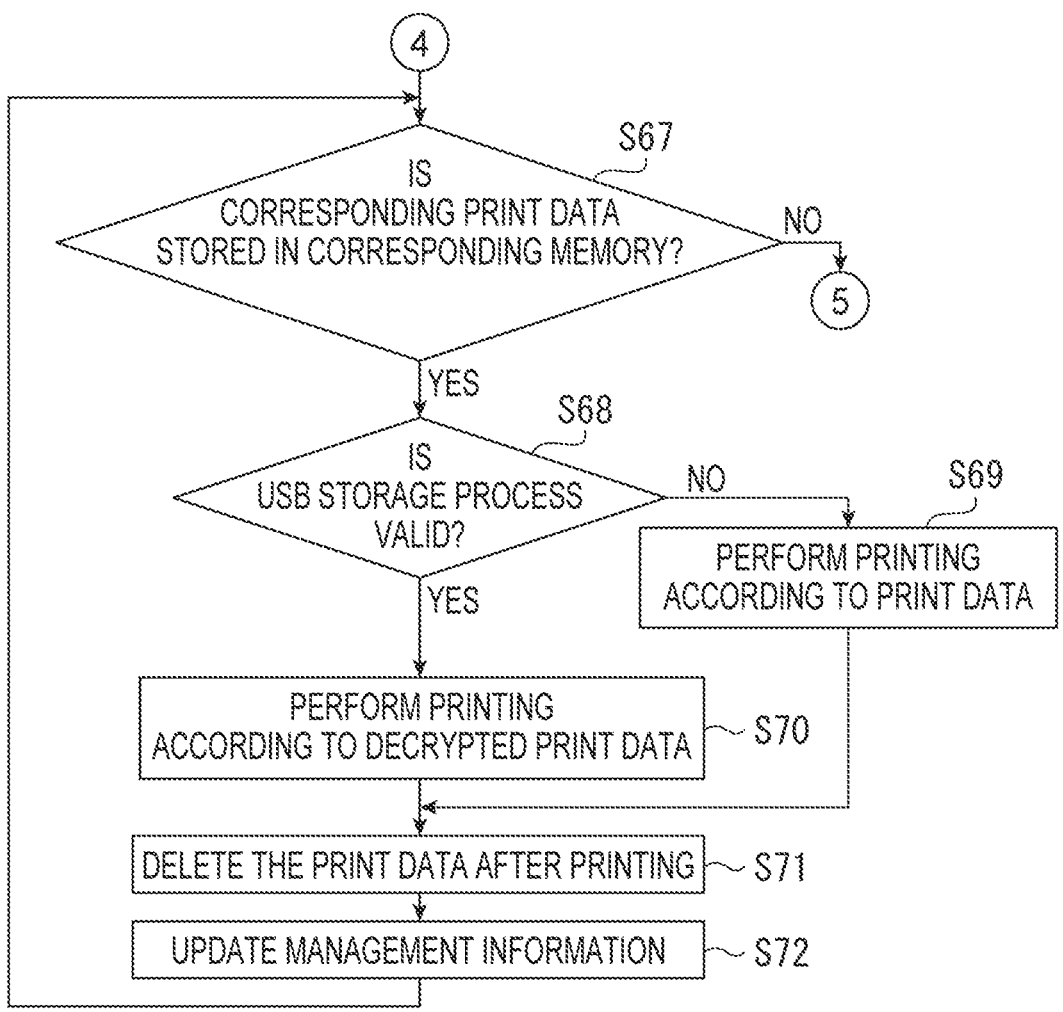

Subsequently, a procedure to perform printing according to the print data stored in the internal memory 14 or the USB memory 23 will be described with reference to FIGS. 12A and 12B. FIGS. 12A and 12B show a process to be performed by the controller 13 in response to receipt of a print instruction operation to cause the MFP 10 to perform printing according to the print data via the user I/F 17. Specifically, the controller 13 starts the process shown in FIGS. 12A and 12B when the print instruction operation has been received via the standby screen 50 displayed on the user I/F 17. When the second storage printing function is valid, further, in response to receiving a login operation to log in to the MFP 10 via the user I/F 17 and determining that login authentication has been successful, the controller 13 starts the process shown in FIGS. 12A and 12B.

In S60, the controller 13 determines whether the USB storage process is set valid, based on the value of the validity determination flag. When determining that the USB storage process is set valid (S60: Yes), the controller 13 proceeds to S62. In S62, the controller 13 determines whether the rear port 21 is set as the dedicated port. When determining that the rear port 21 is set as the dedicated port (S62: Yes), the controller 13 proceeds to S63. In S63, the controller 13 determines the status of the USB memory 23 attached to the rear port 21 in accordance with substantially the same procedure as the process of S15 (see FIG. 3A). Then, when determining that the USB memory 23 attached to the rear port 21 is in the notified status, the controller 13 causes the user I/F 17 to display a corresponding one of substantially the same messages as shown in FIGS. 7 to 10. Meanwhile, when determining that the rear port 21 is not set as the dedicated port (S62: No), the controller 13 proceeds to S64. In S64, the controller 13 determines the status of the USB memory 23 attached to the side port 22 in accordance with substantially the same procedure as the process of S16 (see FIG. 3A).

After completion of S63 or S64, the controller 13 proceeds to S65. In S65, the controller 13 determines whether the dedicated port is in the notified state. When determining that the dedicated port is not in the notified state (S65: No), the controller 13 proceeds to S66. In S66, the controller 13 decrypts the management information 30b stored in the dedicated memory with the encryption key 31, and reads out the decrypted management information 30b. When the first storage printing function is set valid, and the USB storage process is set valid, the management information 30b is a list of print data to each of which a PIN code is added. On the other hand, when the second storage printing function is set valid, and the USB storage process is set valid, the management information 30b is a list of print data to each of which a user name is added. The decrypted management information 30b is stored in the internal memory 14. After completion of S66, the controller 13 proceeds to S67.

When determining in S60 that the USB storage process is not set valid (S60: No), the controller 13 proceeds to S61 to read out the management information 30a stored in the internal memory 14. The management information 30a read out in S61 is a list of print data each of which is associated with a PIN code or a user name.

In S67, the controller 13 determines whether the print data corresponding to the current function (i.e., the first storage printing function or the second storage printing function) is stored in the corresponding memory, using the management information 30 read out in S61 or S66. Specifically, when the first storage printing function is set valid, the controller 13 causes the user I/F 17 to display a screen configured to receive a PIN code input by the user, and determines whether the same PIN code as input by the user is stored in the management information 30. Meanwhile, when the second storage printing function is set valid, the controller 13 determines whether the user name of the login user is stored in the management information 30. When determining that the print data corresponding to the current function is not stored in the corresponding memory (S67: No), the controller 13 terminates the process shown in FIGS. 12A and 12B. It is noted that when the second storage printing function is set valid, the controller 13 may start the process shown in FIGS. 12A and 12B in response to receipt of a login operation via the standby screen 50. Moreover, the controller 13 may start the process shown in FIGS. 12A and 12B in response to receipt of a print instruction operation via the standby screen 50 in a state where the login operation has been accepted. Further, the controller 13 may receive the login operation in S67. Furthermore, when the second storage printing function is set valid, the controller 13 may start the process shown in FIGS. 12A and 12B after receiving the PIN code input by the user. In this case, the acceptance of the PIN code input by the user in S67 may be omitted.

On the other hand, when determining that the print data corresponding to the current function is not stored in the corresponding memory (S67: No), the controller 13 proceeds to S68. In S68, the controller 13 determines whether it has been determined in S61 that the USB storage process is set valid. When determining that it has been determined in S61 that the USB storage process is set valid (S68: Yes), the controller 13 proceeds to S70. Meanwhile, when determining that it has been determined in S61 that the USB storage process is invalid (S68: No), the controller 13 proceeds to S69. In S70 and S69, the controller 13 selects the print data corresponding to the PIN code, or the user name of the login user with reference to the management information 30, and performs printing according to the selected print data. At this time, in S70, the controller 13 decrypts the print data stored in the dedicated memory using the encryption key 31. Then, the controller 13 causes the print engine 15 to perform printing according to the decrypted print data.

After completion of S69 or S70, the controller 13 proceeds to S71. In S71, the controller 13 deletes the print data used for the printing by the print engine 15 in S69 or S70. Specifically, the controller 13 deletes the print data itself and temporary data generated in the printing. In S72, the controller 13 deletes information (more specifically, a record) related to the print data used for the printing from the management information 30, thereby updating the management information 30. It is noted that the controller 13 may execute S72 after completion of the printing according to all the print data associated with the input PIN code or the user name of the login user.

After completion of S72, the controller 13 goes back to S67. When determining in S67 that the print data corresponding to the current function is stored in the corresponding memory (S67: Yes), the controller 13 repeatedly performs the processes of S68 to S72. When determining in S67 that the print data corresponding to the current function is not stored in the corresponding memory (S67: No), the controller 13 terminates the process shown in FIGS. 12A and 12B. In the case where the controller 13 goes from S72 back to S67, when the first storage printing function is set valid, since the PIN code has already been input by the user, the controller 13 may not again receive the PIN code input by the user in S67.

Figure 4:
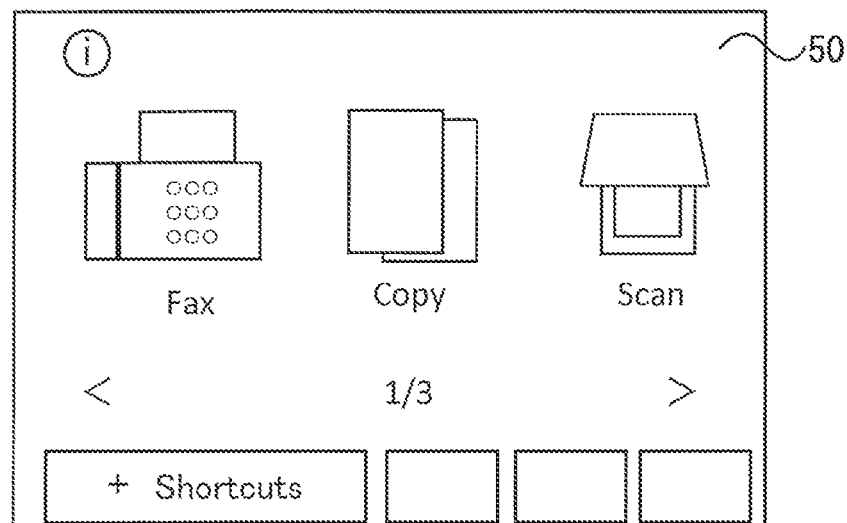
FIG. 4 shows an example of a standby screen displayed on the MFP.

When determining in S65 that the dedicated port is in the notified state (S65: Yes), the controller 13 terminates the process shown in FIGS. 12A and 12B. In this case, the controller 13 causes the user I/F 17 to display the standby screen 50 as shown in FIG. 4. The user may perform a print instruction operation again by operating the standby screen 50 after resolving the notified status. After determining to set the USB storage process valid (S10: Yes), the controller 13 has already determined the status of the dedicated port in the procedure of S15. However, for substantially the same reason as why the controller 13 performs the process of S45, the controller 13 performs the process of S63. For instance, when the notification screen is displayed in S63 since the USB memory 23 attached to the rear port 21 is set write-protected, the user may cancel the write-protect setting for the USB memory 23. In this case, during the next execution of the process shown in FIGS. 12A and 12B, the controller 13 determines that the dedicated port is not in the notified state (S65: No), and proceeds to S66. Then, when the controller 13 proceeds to S71 after printing according to the print data stored in the dedicated memory in S70, since the dedicated memory is not set write protected, the controller 13 is allowed to delete the print data.

The illustrative embodiment as described above produces the following advantageous effects. When the rear port 21 is set as the dedicated port, the controller 13 of the MFP 10 determines whether the rear port 21 is in the notified status. When determining that the rear port 21 is in the notified status, the controller 13 causes the user I/F 17 to display the notification screen indicating that the rear port 21 is in the notified status. Thereby, the user is allowed to recognize the status of the rear port 21 by viewing the notification screen. Thus, it is possible to improve the user-friendliness of the image forming apparatus.

When the rear port 21 is set as the dedicated port, and job data has been received as target data to be processed by the storage printing function, the controller 13 determines whether the rear port 21 is in the notified status. Thereby, it is possible to provide a notification to the user even when the rear port 21 comes into the notified status after the rear port 21 has been set as the dedicated port.

When the rear port 21 is set as the dedicated port, the controller 13 may show on the notification screen that no USB memory 23 is attached to the rear port 21. Thereby, the user is allowed to realize that no USB memory 23 is attached to the rear port 21 which is difficult for the user to visually recognize.

In response to receipt of an instruction to set the rear port 21 as the dedicated port via the storage destination setting screen 55, the controller 13 determines whether the rear port 21 is in the notified status. Thereby, it is possible to provide a notification to the user when the user has mistakenly set the dedicated port.

The controller 13 causes the user I/F 17 to display the notification screen when the USB memory 23 attached to the rear port 21 is unable to store data. Thereby, the user is allowed to recognize that the USB memory 23 attached to the rear port 21 is unable to store data.

The controller 13 may cause the user I/F 17 to display the notification screen representing that the USB memory 23 attached to the rear port 21 is set write-protected. Thereby, the user is allowed to recognize that the USB memory 23 attached to the rear port 21 is set write-protected and therefore unusable.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein.

The controller 13 may cause the user I/F 17 to display a notification screen when the rear port 21 is set as the dedicated port, and a USB memory 23 not set as the dedicated memory is attached to the rear port 21. In this case, in the determination (see FIG. 6) regarding the notified status as made in S45 of FIG. 11, the controller 13 may proceed to S34 to cause the user I/F 17 to display the notification screen, when determining in S30 that no USB memory 23 is attached to the rear port 21 or that the USB memory 23 not set as the dedicated memory is attached to the rear port 21. The same may apply to the determination regarding the notified status as made in S63 of FIG. 12A. Thereby, the user is allowed to realize that no USB memory 23 is attached to the rear port 21 or that the USB memory 23 not set as the dedicated memory is attached to the rear port 21. Namely, the user is allowed to recognize that the dedicated memory needs to be attached to the rear port 21.

Figure 11:
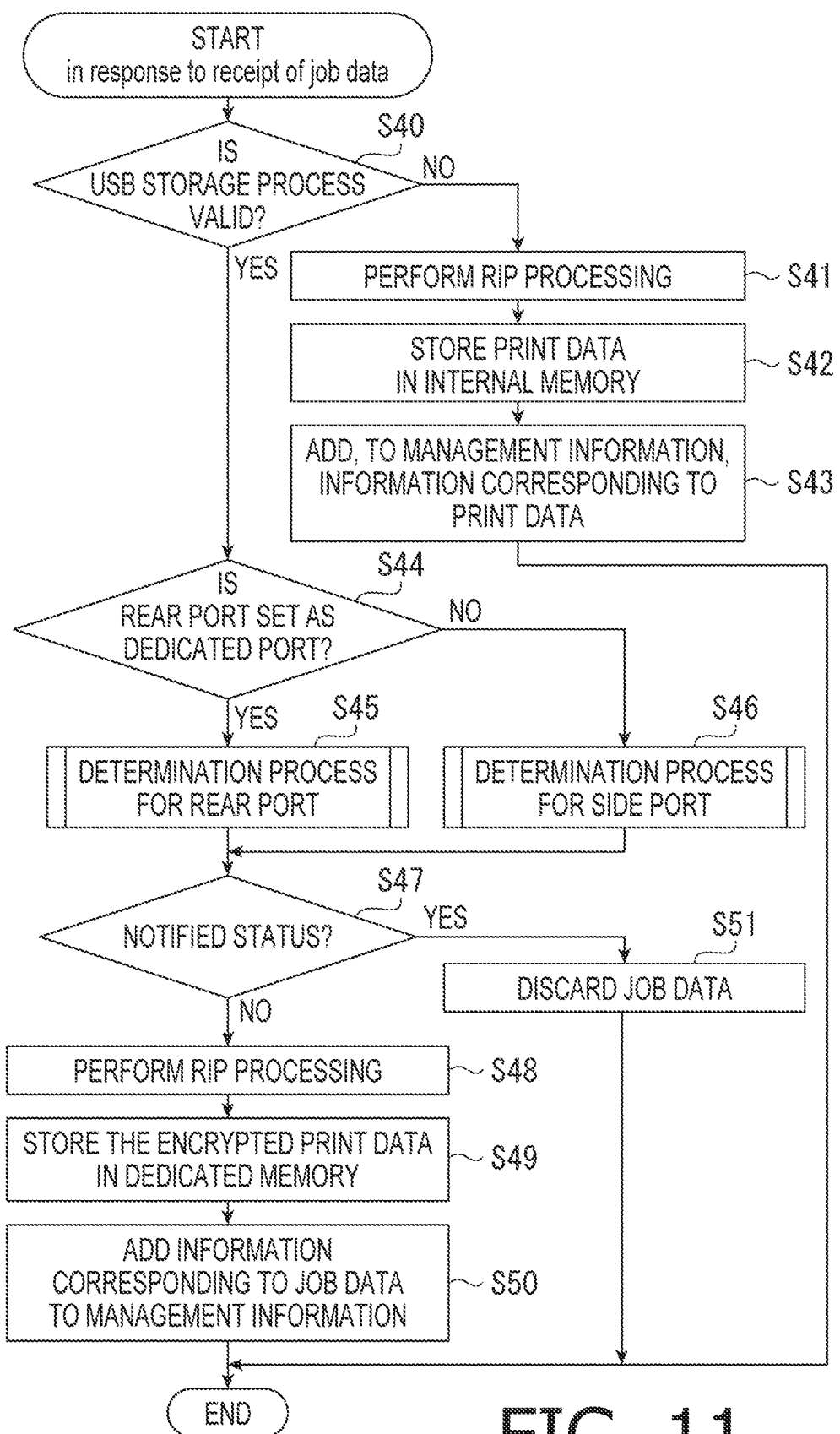
FIG. 11 is a flowchart showing a procedure of a process to store print data among processes pertaining to a storage printing function.
Figure 13A:
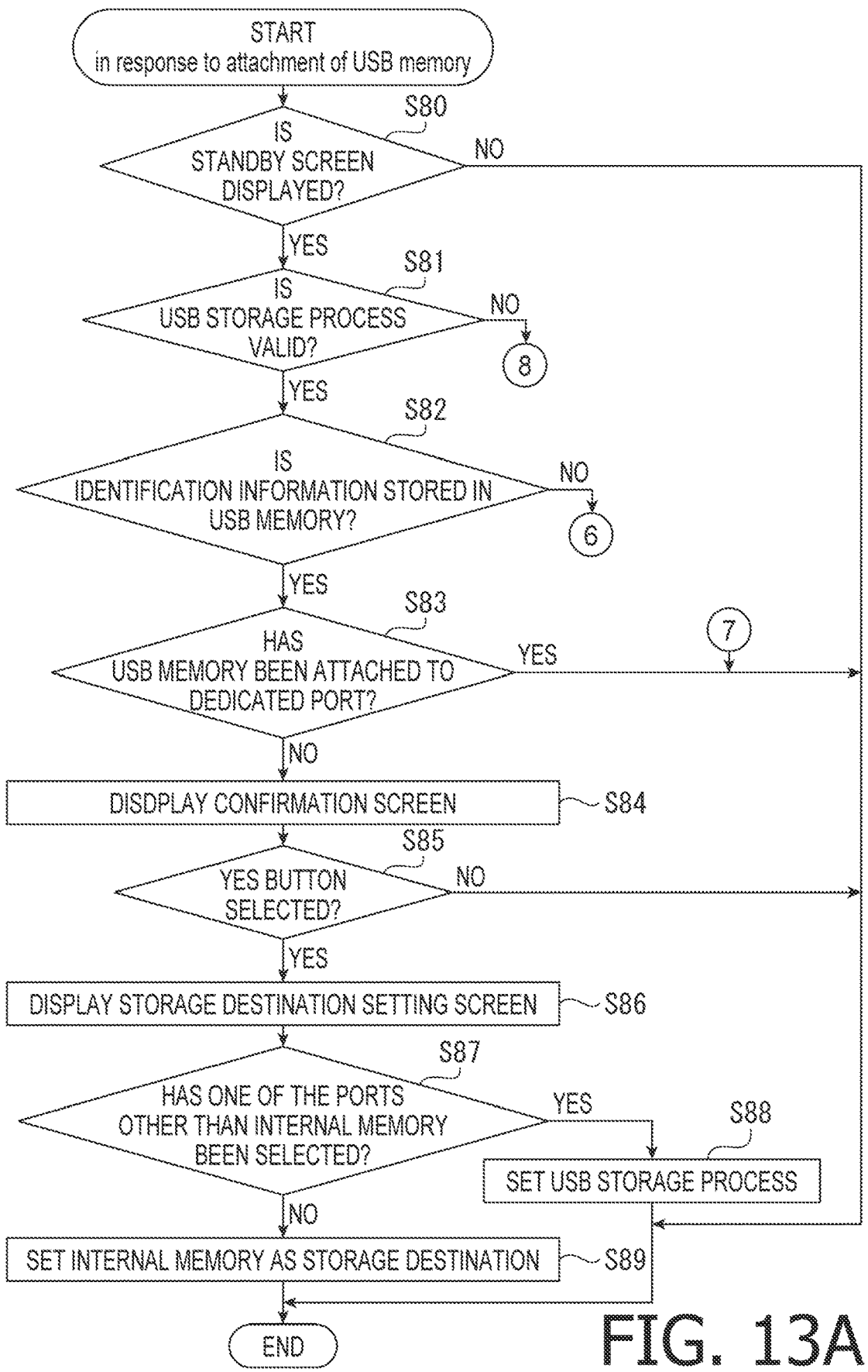
FIGS. 13A to 13C are flowcharts showing a procedure of a process to be performed in response to a USB memory being attached to one of the ports.
Figure 13B:
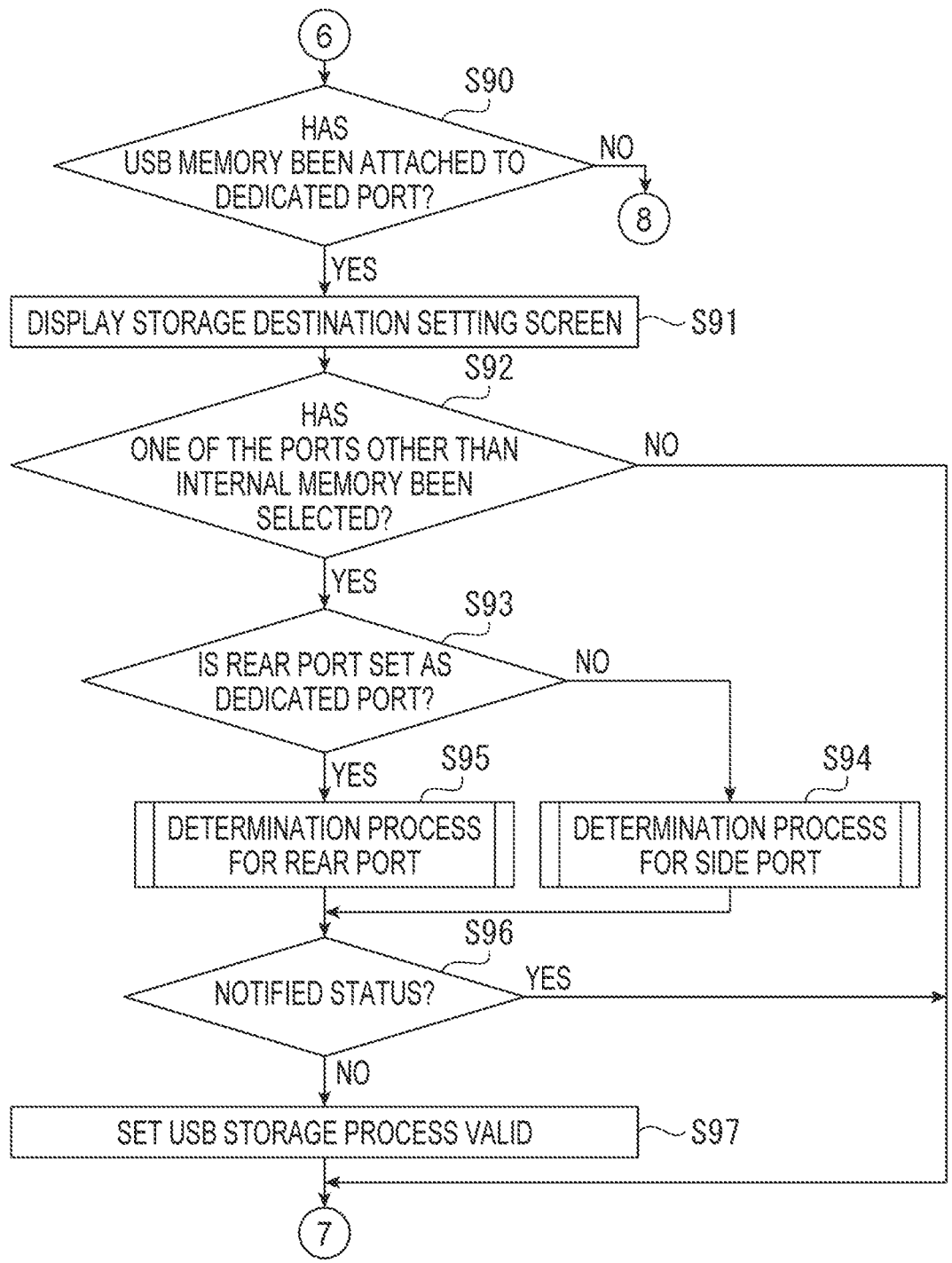
Figure 13C:
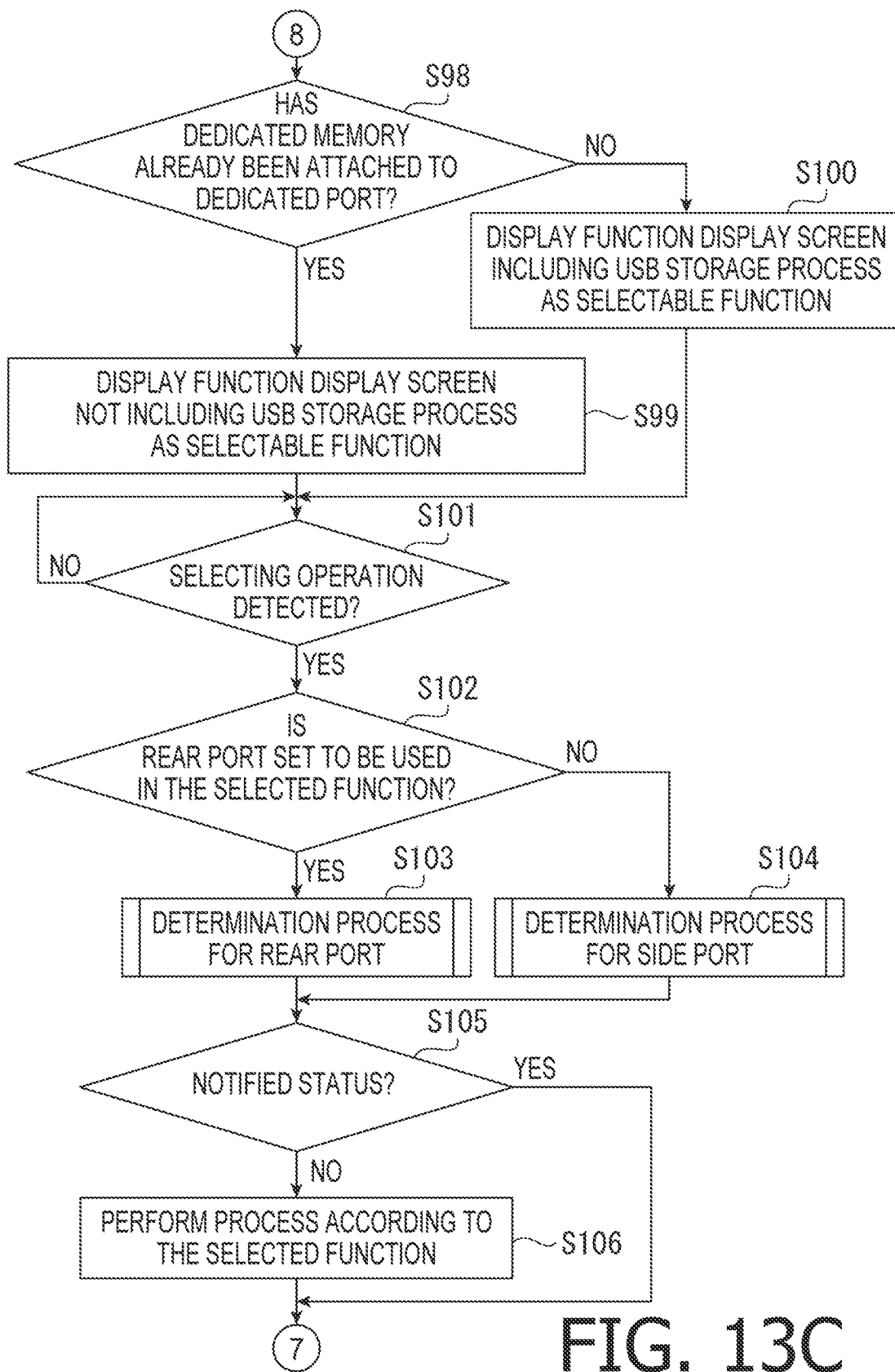

Besides the processes shown in FIGS. 3A and 3B and FIG. 11, the controller 13 may also determine whether the rear port 21 is in the notified status, in response to a USB memory 23 being attached to one of the ports 21 and 22. An explanation will be provided of a process to be performed in response to the USB memory 23 being attached to the port 21 or 22, with reference to FIGS. 13A to 13C. FIGS. 13A to 13C are flowcharts showing a procedure of a process to be performed by the controller 13 in response to the USB memory 23 being attached to the port 21 or 22. It is noted that the attachment of the USB memory 23 is also detected when the MFP 10 is powered on in a state where the USB memory 23 is attached to the port 21 or 22. Hence, in this case as well, the controller 13 starts the process shown in FIGS. 13A to 13C.

In S80, the controller 13 determines whether the standby screen 50 (see FIG. 4) is displayed on the user I/F 17. When determining that the standby screen 50 is not displayed on the user I/F 17 (S80: No), the controller 13 terminates the process shown in FIGS. 13A to 13C. This is because of the following reasons. In a situation where the standby screen 50 is not displayed on the user I/F 17, the controller 13 is performing some process. Therefore, in such a situation, the controller 13 does not perform a below-mentioned process of changing the memory as the storage destination or a below-mentioned process of changing the function using the USB memory 23, until the process in progress is completed. When determining that the standby screen 50 is displayed on the user I/F 17 (S80: Yes), the controller 13 proceeds to S81.

In S81, the controller 13 determines whether the USB storage process is currently set valid, with reference to the validity determination flag. When determining that the USB storage process is currently set valid (S81: Yes), the controller 13 proceeds to S82. In S82, the controller 13 determines whether the USB memory 23 attached to the port this time stores the identification information 34 paired with the encryption key 31. Specifically, in S82, the controller 13 determines whether the USB memory 23 attached to the port this time stores the encrypted management information 30*b* and whether the encrypted management information 30*b* is decryptable using the encryption key 31. When determining that the USB memory 23 attached to the port this time stores the identification information 34 paired with the encryption key 31 (S82: Yes), the controller 13 proceeds to S83.

In S83, the controller 13 determines whether the port to which the USB memory 23 has been attached this time is the dedicated port, with reference to the setting information 32. When determining that the port to which the USB memory 23 has been attached this time is the dedicated port (S83: Yes), the controller 13 terminates the process shown in FIGS. 13A to 13C. The MFP 10 is enabled to store the print data in the storage printing function even when the dedicated memory is once removed from the dedicated port and thereafter attached to the dedicated port again. Therefore, when it is determined that the port to which the USB memory 23 has been attached this time is the dedicated port (S83: Yes), it may be assumed that the user has just removed the dedicated memory from the dedicated port and then has re-attached the dedicated memory to the dedicated port.

When determining that the port to which the USB memory 23 has been attached this time is not the dedicated port (S83: No), the controller 13 proceeds to S84 to cause the user I/F 17 to display a confirmation screen. The confirmation screen displayed in S84 includes a message for inquiring of the user whether to make a transition of the display on the user I/F 17 to a storage destination changing screen for changing the port to be used in the USB storage process. When a NO button has been selected on the confirmation screen, the controller 13 makes a negative determination in S85 and terminates the process shown in FIGS. 13A to 13C. Meanwhile, when a YES button has been selected on the confirmation screen, the controller 13 makes an affirmative determination in S85 and proceeds to S86.

In S86, the controller 13 causes the user I/F 17 to display the storage destination setting screen 55 (see FIG. 5). After receiving an instruction to select one of the available choices for the storage destination on the storage destination setting screen 55 displayed in S86, the controller 13 determines in S87 whether one of the ports 21 and 22 other than the internal memory 14 has been selected on the storage destination setting screen 55. When determining that one of the ports 21 and 22 other than the internal memory 14 has been selected on the storage destination setting screen 55 (S87: Yes), the controller 13 proceeds to S88. In S88, the controller 13 sets the USB storage process, for which the USB memory 23 attached to the port selected in S86 is set as the storage destination for print data. Specifically, for instance, when it is assumed that the user provides an instruction to select the port 21 to which the dedicated memory has been attached this time on the storage destination setting screen 55, the controller 13 sets the port 21 as the dedicated port. At this time, the controller 13 cancels a dedicated-port setting for the port 22 that has already been set as the dedicated port. The controller 13 updates the setting information 32 according to the newly-configured dedicated-port setting for the port 21 and the cancellation of the dedicated-port setting for the port 22.

Meanwhile, when determining in S87 that none of the ports 21 and 22 other than the internal memory 14 has been selected, i.e., that the internal memory 14 has been selected on the storage destination setting screen 55 (S87: No), the controller 13 proceeds to S89. In S89, the controller 13 sets the internal memory 14 as the storage destination for print data. At this time, the controller 13 sets the USB storage process invalid by cancelling the dedicated-port setting for the port 22 that has already been set as the dedicated port. After completion of S88 or S89, the controller 13 terminates the process shown in FIGS. 13A to 13C.

When determining that the USB memory 23 attached to the port this time does not store the identification information 34 paired with the encryption key 31 (S82: No), the controller 13 proceeds to S90. In S90, the controller 13 determines whether the port to which the USB memory 23 has been attached this time is set as the dedicated port, with reference to the setting information 32. When determining that the port to which the USB memory 23 has been attached this time is set as the dedicated port (S90: Yes), the controller 13 proceeds to S91. In S91, the controller 13 causes the user I/F 17 to display the storage destination setting screen 55. This is because the user may have mistakenly attached the USB memory 23, which is not set as the dedicated memory, to the port set as the dedicated port.

When one of the ports 21 and 22 other than the internal memory 14 has been selected on the storage destination setting screen 55 displayed in S91 (S92: Yes), the controller 13 proceeds to S93. In S93, the controller 13 determines whether the rear port 21 is set as the dedicated port. When determining that the rear port 21 is set as the dedicated port (S93: Yes), the controller 13 proceeds to S95. In S95, the controller 13 determines the status of the USB memory 23 attached to the rear port 21 in accordance with substantially the same procedure as the process of S15 (see FIG. 3A), and displays a corresponding one of substantially the same messages as shown in FIGS. 7 to 10 when determining that the USB memory 23 attached to the rear port 21 is in the notified status.

Figure 14:
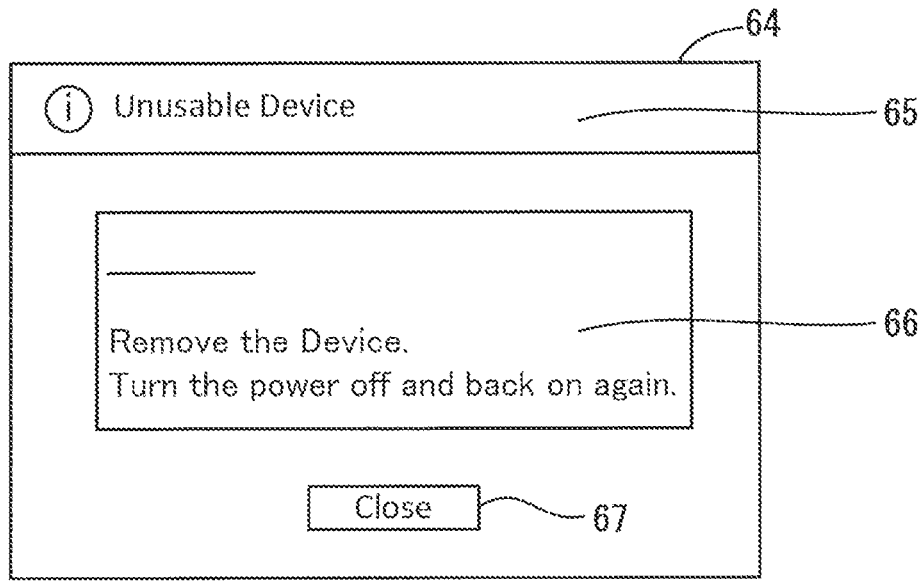
FIG. 14 shows an example of a notification screen representing that the USB memory attached to the rear port is in a failure status.

FIG. 14 shows a notification screen 64 displayed in S95 when a failure status of the USB memory 23 attached to the rear port 21 has been detected. In substantially the same manner as the notification screen 64 (see FIG. 8) displayed in S35 (see FIG. 6), the notification screen 64 shown in FIG. 14 includes a message 65 indicating a cause (i.e., what to be notified via the notification screen 64) for the notification screen 64 to be displayed, a message body 66, and a close button 67. A difference between the notification screen 64 shown in FIG. 14 and the notification screen 64 displayed in S35 is that the message body 66 in FIG. 14 does not contain a message representing that the notification screen 64 is for the rear port 21. This is because the process shown in FIGS. 13A to 13C is performed in response to the USB memory 23 being attached to one of the ports 21 and 22, and therefore the user already recognizes which port the USB memory 23 is attached to at the time when the process shown in FIGS. 13A to 13C is started. Further, with respect to a notification screen to be displayed when the USB memory 23 attached to the rear port 21 is set write-protected, and a notification screen to be displayed when the available storage capacity of the USB memory 23 attached to the rear port 21 is insufficient, each message body thereof does not contain a message representing that the corresponding notification screen is for the rear port 21. Moreover, in S95, the controller 13 may not determine whether the USB memory 23 is attached to the rear port 21.

On the other hand, when determining that the rear port 21 is not set as the dedicated port (S93: No), the controller 13 proceeds to S94. In S94, the controller 13 determines the status of the USB memory 23 attached to the side port 22 in accordance with substantially the same procedure as the process of S16 (see FIG. 3A). In S94 as well, each notification screen displayed on the user I/F 17 does not contain a message representing that each notification screen is for the side port 22.

After completion of S94 or S95, the controller 13 proceeds to S96. In S96, the controller 13 determines whether the dedicated port is currently in the notified status, based on the value of the notification flag set in S94 or S95. When determining that the dedicated port is not currently in the notified status (S96: No), the controller 13 proceeds to S97 to set the USB storage process valid. In this case, the controller 13 updates the setting information 32, thereby cancelling the dedicated-port setting for the port that has already been set as the dedicated port. After completion of S97, the controller 13 terminates the process shown in FIGS. 13A to 13C. Meanwhile, when determining that the dedicated port is currently in the notified status (S96: Yes), the controller 13 terminates the process shown in FIGS. 13A to 13C. Namely, the controller 13 does not accept any setting changes for the dedicated port and the dedicated memory. When the internal memory 14 has been selected on the storage destination setting screen 55, the controller 13 makes a negative determination in S96 (i.e., the controller 13 determines that the dedicated port is not currently in the notified status) (S96: No), and terminates the process shown in FIGS. 13A to 13C.

Figure 15:
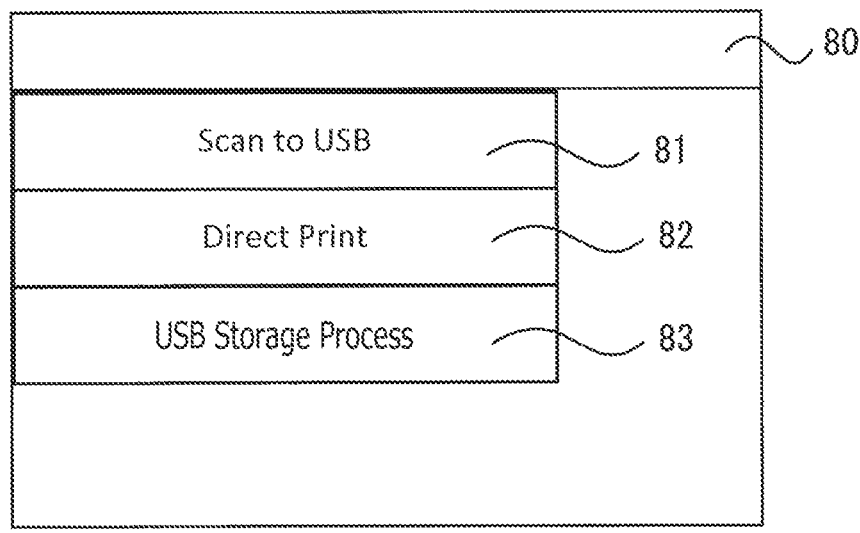
FIG. 15 shows an example of a function display screen displayed on the MFP.

When the USB memory 23 has been attached this time to the port not set as the dedicated port, the controller 13 makes a negative determination in S90 (i.e., the controller 13 determines that the port to which the USB memory 23 has been attached this time is not set as the dedicated port) (S90: No), and proceeds to S98. In S98, the controller 13 determines whether the dedicated memory is attached to the dedicated port. When determining that the dedicated memory is not attached to the dedicated port (S98: No), the controller 13 proceeds to S100 to cause the user I/F 17 to display a function display screen 80 as shown in FIG. 15. It is noted that in S98, the controller 13 may determine whether a USB memory 23, which is different from the USB memory 23 attached to the port this time, is attached to the dedicated port.

The function display screen 80 displayed in S100 includes designation buttons 81, 82, and 83. Each of the designation buttons 81, 82, and 83 is configured to, when operated, accept an instruction to select a corresponding function from among available choices, displayed on the function display screen 80, of functions using the USB memory 23 attached this time. The designation button 81 is an operable button to select "Scan to USB" as a function using the USB memory attached this time. In "Scan to USB," the controller 13 causes the scan engine 16 to scan an image of a document placed on a document table (not shown) and generate scanned data of the image of the document, and stores the generated scanned data in the USB memory 23 attached to the port. The designation button 82 is an operable button to select "Direct Print" as a function using the USB memory attached this time. In "Direct Print," in response to the USB memory 23 being attached to one of the ports 21 and 22, the controller 13 causes the user I/F 17 to display a list of image data stored in the USB memory 23 attached this time, and causes the print engine 15 to perform printing according to image data selected from the displayed list. The designation button 83 is an operable button to select "USB Storage Process" as a function using the USB memory attached this time.

On the other hand, when determining that the dedicated memory is attached to the dedicated port (S98: Yes), the controller 13 proceeds to S99. In S99, the controller 13 causes the user I/F 17 to display a function display screen 80 that is different from the function display screen 80 displayed in S100. The function display screen 80 displayed in S99 includes only the designations buttons 81 and 82. Namely, in S99, "USB Storage Process" is unable to be selected as a function using the USB memory 23. This is because when the dedicated memory is already attached to the dedicated port, the user is unlikely to use the USB memory 23 attached this time in the storage printing function.

After completion of S99 or S100, the controller 13 proceeds to S101. In S101, the controller 13 determines whether one of the functions has been selected on the function display screen 80. When determining that none of the functions has been selected on the function display screen 80 (S101: No), the controller 13 waits until one of the functions is selected on the function display screen 80. When determining that one of the functions has been selected on the function display screen 80 (S101: Yes), the controller 13 proceeds to S102. In S102, the controller 13 determines whether the rear port 21 is set to be used in the selected function. When determining that the rear port 21 is set to be used in the selected function (S102: Yes), the controller 13 proceeds to S103. In S103, the controller 13 determines the status of the USB memory 23 attached to the rear port 21 in accordance with substantially the same procedure as the process of S15 (see FIG. 3A), and displays a corresponding one of substantially the same messages as shown in FIGS. 7 to 10 when determining that the USB memory 23 attached to the rear port 21 is in the notified status. Meanwhile, when determining that the rear port 21 is not set to be used in the selected function (S102: No), the controller 13 proceeds to S104. In S104, the controller 13 determines the status of the USB memory 23 attached to the side port 22 in accordance with substantially the same procedure as the process of S16 (see FIG. 3A).

After completion of S103 or S104, the controller 13 proceeds to S105. In S105, the controller 13 determines whether the port set to be used in the selected function is in the notified status, based on the notification flag set in S103 or S104. When determining that the port set to be used in the selected function is not in the notified status (S105: No), the controller 13 proceeds to S106 to execute the function selected via the function display screen 80. Specifically, when the USB storage process has been selected again, the controller 13 sets the USB memory 23 attached to the port this time as the dedicated memory, and sets the port to which the USB memory 23 has been attached this time as the dedicated port. In this case, the controller 13 cancels the dedicated-port setting for the port that has already been set as the dedicated port. On the other hand, when a function different from the storage printing function has been selected, the controller 13 switches the display on the user I/F 17 to an operable screen for setting the USB memory 23 attached to the port this time to be used in the selected function. After completion of S106, the controller 13 terminates the process shown in FIGS. 13A to 13C.

On the other hand, when determining that the port set to be used in the selected function is in the notified status (S105: Yes), the controller 13 terminates the process shown in FIGS. 13A to 13C. In this case, the controller 13 causes the user I/F 17 to display the standby screen 50 as shown in FIG. 4. The user may attach the USB memory 23 to the port again after resolving the notified status or in order to resolve the notified status.

In the illustrative embodiment as described above, the controller 13 determines whether the rear port 21 is in the notified status when setting the rear port 21 as the dedicated port via the storage destination setting screen 55 that has been displayed in response to the USB memory 23 being attached to one of the ports 21 and 22. When determining that the rear port 21 is in the notified status, the controller 13 causes the user I/F 17 to display a notification screen corresponding to the notified status without indicating that the notification screen is for the rear port 21. Thereby, even when the rear port 21 is set as the dedicated port in response to the USB memory 23 being attached to one of the ports 21 and 22, a notification is made according to the status of the rear port 21. Hence, it is possible to improve the user-friendliness of the image forming apparatus.

When the USB memory 23 has been attached to one of the ports 21 and 22 while the storage destination setting screen 55 is being displayed, the controller 13 maintains the storage destination setting screen 55 to be capable of receiving an instruction to set one of the ports 21 and 22 as the dedicated port. Thereby, the determination of the notified status to be made along with the setting of the storage destination for print data and the determination of the notified status to be made along with the attachment of the USB memory 23 are not performed in succession. Therefore, it is possible to prevent unnecessary determinations from being made as to whether the target port is in the notified status.

In S91 of FIG. 13B, the controller 13 may cause the user I/F 17 to display a confirmation screen instead of the storage destination setting screen 55. In this case, in response to detecting that a YES button has been operated on the confirmation screen displayed in S91, the controller 13 may set the USB memory 23 attached to the port this time as the storage destination to be used in the USB storage process. Then, the controller 13 may proceed to S93. When the USB memory 23 has been attached to the rear port 21 this time, the controller 13 may proceed to S95. In S95, the controller 13 may determine the status of the USB memory 23 attached to the rear port 21 in accordance with substantially the same procedure as the process of S15 (see FIG. 3A). When determining that the USB memory 23 attached to the rear port 21 is in the notified status, the controller 13 may cause the user I/F 17 to display a corresponding one of substantially the same messages as shown in FIGS. 7 to 10.

Meanwhile, when the USB memory 23 has been attached to the side port 22 this time, the controller 13 may proceed to S94.

In the aforementioned illustrative embodiment, the side port 22 is disposed at the left-side portion of the front section 41 (see FIG. 1). In another instance, the port 22 may be disposed at a front-side portion of the front section 41, i.e., on the same side of the front section 41 as the side on which the user I/F 17 is disposed. Moreover, the MFP 10 may have three or more ports.

In the aforementioned illustrative embodiment, in S82 (see FIG. 13A), the controller 13 determines whether the management information 30 decryptable by the encryption key 31 is stored in the USB memory 23. Instead, in S23 (see FIG. 3B), the controller 13 may generate a unique numerical value as determination information and store the generated unique numerical value in the USB memory 23. In S24, the controller 13 may store the same numerical value as generated in S23 in the internal memory 14 as the identification information. In S82 (see FIG. 13A), the controller 13 may determine whether the numerical value stored in the USB memory 23 matches the numerical value stored in the internal memory 14. In this case, when determining that the numerical value stored in the USB memory 23 matches the numerical value stored in the internal memory 14 (S82: Yes), the controller 13 may proceed to S83. Meanwhile, when determining that the numerical value stored in the USB memory 23 does not match the numerical value stored in the internal memory 14 (S82: No), the controller 13 may proceed to S90.

The controller 13 may store the print data in the USB memory 23 without encrypting the print data. In this case, S49 in FIG. 11 and S66 and S70 in FIGS. 12A and 12B may be omitted. Examples of the image forming apparatus according to aspects of the present disclosure may include, but are not limited to, a printer without the scan engine 16 as well as the MFP 10 as described in the aforementioned illustrative embodiment.

The following shows examples of associations between elements exemplified in the aforementioned illustrative embodiments and modifications and elements according to aspects of the present disclosure. The MFP 10 may be an example of an "image forming apparatus" according to aspects of the present disclosure. The housing 40 may be an example of a "housing" according to aspects of the present disclosure. The front section 41 may be an example of a "first section" according to aspects of the present disclosure. The rear section 42 may be an example of a "second section" according to aspects of the present disclosure. The print engine 15 may be an example of a "print engine" according to aspects of the present disclosure. The user I/F 17 may be an example of a "user interface" according to aspects of the present disclosure. The memory I/Fs 11 and 12 may be included in examples of a "memory interface" according to aspects of the present disclosure. The ports 21 and 22 may be included in "a plurality of ports" according to aspects of the present disclosure. The side port 22 may be an example of a "first port" according to aspects of the present disclosure. The rear port 21 may be an example of a "second port" according to aspects of the present disclosure. The ports 21 and 22 may be included in examples of a "port" according to aspects of the present disclosure. The controller 13 may be an example of a "controller" according to aspects of the present disclosure. The internal memory 14 storing programs 14a may be an example of a "non-transitory computer-readable medium storing computer-readable instructions" according to aspects of the present disclosure.

The notification screens 60, 64, 68, and 72 may be included in examples of a "notification screen" according to aspects of the present disclosure. The storage destination setting screen 55 may be an example of a "setting screen" according to aspects of the present disclosure. The standby screen 50 may be an example of a "standby screen" according to aspects of the present disclosure.

What is claimed is:

1. An image forming apparatus comprising:
    a housing having a first section and a second section, the second section being located opposite to the first section in a particular direction;
    a print engine;
    a user interface disposed at the first section of the housing;
    a memory interface having a plurality of ports configured to receive a portable memory removably attached thereto, the plurality of ports including a first port disposed at the first section with the user interface disposed, and a second port disposed at the second section without the user interface; and
    a controller configured to:
        perform a storage printing process comprising:
            storing print data corresponding to received job data in a dedicated memory, the dedicated memory being a portable memory set as a storage destination to store the print data in the storage printing process when attached to a dedicated port among the plurality of ports; and
            causing the print engine to perform printing according to the print data stored in the dedicated memory in response to an operation received via the user interface; and
        prior to the storage printing process, set one of the plurality of ports as the dedicated port, determine whether the second port is in a notified status when the second port disposed at the second section without the user interface is set as the dedicated port, and cause the user interface to display a notification screen representing that the second port is in the notified status when determining that the second port is in the notified status.

2. The image forming apparatus according to claim 1, wherein the controller is further configured to:
    in the storage printing process, when the dedicated memory is removed from the port set as the dedicated port and thereafter re-attached to the dedicated port, enable the dedicated memory attached to the dedicated port to store the print data; and
    when the second port is set as the dedicated port, determine whether the second port is in the notified status in response to receipt of the job data.

3. The image forming apparatus according to claim 1, wherein the controller is further configured to:
    when the second port is set as the dedicated port, and no portable memory is attached to the second port, determine that the second port is in the notified status; and
    when determining that no portable memory is attached to the second port, cause the user interface to display the notification screen representing that no portable memory is attached to the second port.

4. The image forming apparatus according to claim 1, wherein the controller is further configured to:
    when the second port is set as the dedicated port, and a portable memory that is not set as the dedicated memory is attached to the second port, determine that the second port is in the notified status; and when determining that the portable memory that is not set as the dedicated memory is attached to the second port, cause the user interface to display the notification screen representing that the portable memory that is not set as the dedicated memory is attached to the second port.

5. The image forming apparatus according to claim 1, wherein the controller is further configured to:
cause the user interface to display a setting screen configured to receive an instruction to set one of the plurality of ports as the dedicated port;
in response to receipt of the instruction via the setting screen, set the port specified by the received instruction as the dedicated port; and
when the port specified by the received instruction is the second port, determine whether the second port is in the notified status.

6. The image forming apparatus according to claim 5, wherein the controller is further configured to:
in response to a portable memory being attached to one of the plurality of ports, cause the user interface to display the setting screen;
when setting the second port as the dedicated port via the setting screen, determine whether the second port is in the notified status; and
when determining that the second port is in the notified status, cause the user interface to display the notification screen without indicating that the notification screen is for the second port.

7. The image forming apparatus according to claim 6, wherein the controller is further configured to:
in response to an operation onto a standby screen displayed on the user interface, cause the user interface to display the setting screen;
in response to receipt of an instruction to set the second port as the dedicated port via the setting screen, determine whether the second port is in the notified status;
when determining that the second port is in the notified status, cause the user interface to display the notification screen indicating that the notification screen is for the second port; and
in response to a portable memory being attached to one of the plurality of ports while the setting screen is being displayed, maintain the setting screen to be capable of receiving an instruction to set one of the plurality of ports as the dedicated port.

8. The image forming apparatus according to claim 5, wherein the controller is further configured to:
in response to an operation onto a standby screen displayed on the user interface, cause the user interface to display the setting screen;
in response to receipt of an instruction to set the second port as the dedicated port via the setting screen, determine whether the second port is in the notified status; and
when determining that the second port is in the notified status, cause the user interface to display the notification screen indicating that the notification screen is for the second port.

9. The image forming apparatus according to claim 5, wherein the controller is further configured to:
when the second port is set as the dedicated port, and no portable memory is attached to the second port, determine that the second port is in the notified status; and
when determining that no portable memory is attached to the second port, cause the user interface to display the notification screen representing that no portable memory is attached to the second port.

10. The image forming apparatus according to claim 5, wherein the controller is further configured to:
when the second port is set as the dedicated port, and a portable memory that is not set as the dedicated memory is attached to the second port, determine that the second port is in the notified status; and
when determining that the portable memory that is not set as the dedicated memory is attached to the second port, cause the user interface to display the notification screen representing that the portable memory that is not set as the dedicated memory is attached to the second port.

11. The image forming apparatus according to claim 1, wherein the controller is further configured to, when a portable memory attached to the second port is unable to store the print data, determine that the second port is in the notified status.

12. The image forming apparatus according to claim 11, wherein the controller is further configured to:
when the portable memory attached to the second port is set write-protected, determine that the portable memory attached to the second port is unable to store the print data; and
when determining that the portable memory attached to the second port is set write-protected, cause the user interface to display the notification screen representing that the portable memory attached to the second port is set write-protected.

13. The image forming apparatus according to claim 1, wherein the controller is further configured to:
when setting the first port as the dedicated port, determine whether the first port is in the notified status; and
when determining that the first port is in the notified status, cause the user interface to display a notification screen representing that the first port is in the notified status.

14. The image forming apparatus according to claim 1, further comprising a non-transitory computer-readable medium storing computer-readable instructions, the instructions being configured to, when executed by the controller, cause the controller to:
perform the storage printing process;
prior to the storage printing process, set one of the plurality of ports as the dedicated port;
when the second port disposed at the second section without the user interface is set as the dedicated port, determine whether the second port is in the notified status; and
when determining that the second port is in the notified status, cause the user interface to display the notification screen representing that the second port is in the notified status.

15. An image forming apparatus comprising:
a print engine;
a user interface;
a memory interface having a port configured to receive a portable memory removably attached thereto; and
a controller configured to:
perform a storage printing process comprising:
storing print data corresponding to received job data in a dedicated memory, the dedicated memory being a portable memory attached to the port that is set as a storage destination to store the print data in the storage printing process; and causing the print engine to perform printing according to the print data stored in the dedicated memory in response to an operation received via the user interface; and prior to the storage printing process, set the portable memory attached to the port as the dedicated memory, in response to receipt of a print instruction in the storage printing process, determine whether the portable memory set as the dedicated memory is set write-protected, before causing the print engine to perform printing according to the print data, and when determining that the portable memory set as the dedicated memory is set write-protected, cause the user interface to display a notification screen.

16. The image forming apparatus according to claim 15, further comprising a non-transitory computer-readable medium storing computer-readable instructions, the instructions being configured to, when executed by the controller, cause the controller to:

perform the storage printing process;

prior to the storage printing process, set the portable memory attached to the port as the dedicated memory;

in response to receipt of the print instruction in the storage printing process, determine whether the portable memory set as the dedicated memory is set write-protected, before causing the print engine to perform printing according to the print data; and when determining that the portable memory set as the dedicated memory is set write-protected, cause the user interface to display the notification screen.

* * * * *